(12) United States Patent
Patel et al.

(10) Patent No.: US 12,192,048 B2
(45) Date of Patent: Jan. 7, 2025

(54) SYSTEMS AND METHODS FOR PROCESSING DATA STREAMS

(71) Applicant: Evertz Microsystems Ltd., Burlington (CA)

(72) Inventors: Rakesh Thakor Patel, Mississauga (CA); Jeff Wei, Richmond Hill (CA); Barnaby Dalton, Mississauga (CA)

(73) Assignee: Evertz Microsystems Ltd., Burlington (CA)

( * ) Notice: Subject to any disclaimer, the term of this patent is extended or adjusted under 35 U.S.C. 154(b) by 0 days.

(21) Appl. No.: 17/112,187

(22) Filed: Dec. 4, 2020

(65) Prior Publication Data

US 2021/0176118 A1 Jun. 10, 2021

Related U.S. Application Data

(60) Provisional application No. 62/944,543, filed on Dec. 6, 2019.

(51) Int. Cl.
*H04L 7/00* (2006.01)
*H04L 41/0659* (2022.01)
*H04L 41/0816* (2022.01)

(52) U.S. Cl.
CPC ........ *H04L 41/0661* (2023.05); *H04L 7/0079* (2013.01); *H04L 7/0091* (2013.01); *H04L 41/0816* (2013.01)

(58) Field of Classification Search
CPC ............. H04L 41/0672; H04L 41/0816; H04L 7/0079; H04L 7/0091

USPC ......................................................... 709/221
See application file for complete search history.

(56) References Cited

U.S. PATENT DOCUMENTS

| | | | |
|---|---|---|---|
| 7,178,147 B2 * | 2/2007 | Benhase | G06F 9/505 |
| | | | 718/107 |
| 8,250,548 B2 | 8/2012 | Kasahara et al. | |
| 8,284,205 B2 * | 10/2012 | Miller | G06F 15/16 |
| | | | 345/501 |
| 9,455,931 B2 * | 9/2016 | Bone | G06F 9/5088 |
| 2009/0109230 A1 * | 4/2009 | Miller | G06F 9/5044 |
| | | | 345/506 |
| 2011/0307661 A1 * | 12/2011 | Smith | G06F 15/7878 |
| | | | 710/266 |
| 2017/0374147 A1 * | 12/2017 | McNair | H04L 41/0896 |
| 2018/0316729 A1 | 11/2018 | Chauvet et al. | |
| 2019/0012278 A1 | 1/2019 | Sindhu et al. | |
| 2019/0121652 A1 * | 4/2019 | Tayeb | G06F 9/44505 |
| 2019/0166019 A1 * | 5/2019 | Jagadeesh | H04L 41/5054 |

* cited by examiner

*Primary Examiner* — James E Springer
*Assistant Examiner* — Patrick F Ngankam
(74) *Attorney, Agent, or Firm* — SMART & BIGGAR LP

(57) ABSTRACT

Systems and methods are provided for processing data streams. The system includes at least one data source for transmitting a data stream to a data transmission network; at least one specific purpose processor in communication with the data transmission network, wherein the specific purpose processor is configured to provide a specific data processing operation; a controller coupled the data transmission network, the controller configured to: determine that the data stream requires processing according to a data processing operation; identify a data processing configuration corresponding to the data processing operation; and route the data stream to the at least one specific purpose processor.

18 Claims, 11 Drawing Sheets

SYSTEMS AND METHODS FOR PROCESSING DATA STREAMS

CROSS REFERENCE TO RELATED PATENT APPLICATION

This application claims the benefit of U.S. Provisional Patent Application No. 62/944,543, filed Dec. 6, 2019, entitled "SYSTEMS AND METHODS FOR PROCESSING DATA STREAMS". The entire contents of U.S. Provisional Patent Application No. 62/944,543 is hereby incorporated by reference.

FIELD

The described embodiments relate to processing data streams, and in particular, to processing data streams using a processing system with a plurality of processors.

BACKGROUND

In various cases, data processing systems may need to process data streams having different processing requirements. Processing requirements for data streams can depend on, for example, the type of processing operation required to be performed on each data stream, the complexity of the processing operation, and the processing priority of the data streams.

In view of the foregoing, it is desirable to have a data processing system that designates data streams to processors having regard for each data stream's processing requirements, as well as each processor's data processing functionality, processing power, and current and/or future processing availability, among other things.

SUMMARY OF VARIOUS EMBODIMENTS

In at least one broad aspect, there is provided a system for processing data streams, comprising: at least one data source for transmitting a data stream to a data transmission network; at least one specific purpose processor in communication with the data transmission network, wherein the specific purpose processor is configured to provide a specific data processing operation; a controller coupled the data transmission network, the controller configured to: determine that the data stream requires processing according to a data processing operation; identify a data processing configuration corresponding to the data processing operation; and route the data stream to the at least one specific purpose processor.

In some cases, the controller is further configured to control the at least one data source to transmit the data stream to the data transmission network.

In some cases, the data processing operation comprises a plurality of sub data processing operations.

In some cases, the at least one specific purpose processor is configurable to implement the data processing configuration by changing a hardware configuration of the at least one specific purpose processor.

In some cases, the hardware configuration in the at least one specific purpose processor is changed in response to receiving configuration instructions in respect of the data processing configuration.

In some cases, the controller is configured to transmit the configuration instructions to the at least one specific purpose processor.

In some cases, the controller is configured to generate the configuration instructions.

In some cases, the system further comprises a data storage in communication with the data transmission network, the data storage storing configurations instructions, and the controller is further configured to retrieve the configuration instructions form the data storage, and transmit the configuration instructions to the at least one specific purpose processor.

In some cases, the system further comprises at least one general purpose processor in communication with the data transmission network, wherein the configuration instructions are stored on the general purpose processor, and the controller is further configured to at least one of: retrieve the configuration instructions from the general purpose processor and transmit the configuration instructions to the at least one specific purpose processor; and transmit instructions to the general purpose processor to transmit the configuration instructions to the at least one specific purpose processor.

In some cases, the at least one general purpose processor is configured to generate the configuration instructions.

In some cases, the system further comprises at least one general purpose processor in communication with the data transmission network, and wherein the controller is further configured to: route the data stream to the at least one general purpose processor; determine that the at least one general purpose processor is operating substantially at processing load capacity; route the data stream to the at least one specific purpose processor.

In some cases, the data stream comprises a media stream, and the data processing operation comprises at least one of: extracting a characteristic feature from the media stream, comparing one or more characteristic features extracted from one or more media streams to determine a synchronization error, and adjusting one or more media streams to compensate for the synchronization error.

In some cases, the data transmission network comprises a software defined network.

In some cases, the at least one specific purpose processor is a field programmable gate array (FPGA).

In another broad aspect, there is provided a method for processing data streams, comprising: determining, at a controller, that data streams, transmitted by at least one data source to a data transmission network, require processing according to a data processing operation; identifying, by the controller, a data processing configuration corresponding to the data processing operation; and routing, by the controller, the data streams, through the data transmission network, to at least one specific purpose processor in communication with the data transmission network, wherein the at least one specific purpose processor is configured to provide a specific data processing operation.

In some cases, the method further comprises controlling, by the controller, the at least one data source to transmit the data stream to the data transmission network.

In some cases, the data processing operation comprises a plurality of sub data processing operations.

In some cases, the method further comprises implementing, by the at least one specific purpose processor, the data processing configuration by changing a hardware configuration of the at least one specific purpose processor.

In some cases, the method further comprises receiving, at the at least one specific purpose processor, configuration instructions for changing the hardware configuration of the at least one specific purpose processor to implement the data processing configuration.

In some cases, the method further comprises transmitting, by the controller, the configuration instructions to the at least one specific purpose processor.

In some cases, the method further comprises generating, by the controller, the configuration instructions prior to transmitting the configuration instructions to the at least one specific purpose processor.

In some cases, the method further comprises retrieving, by the controller, the configuration instructions from a data storage unit and transmitting, by the controller, the configuration instructions to the at least one specific purpose processor.

In some cases, the method further comprises at least one of: retrieving, by the controller, the configuration instructions from a general purpose processor in communication with the data transmission network, and transmitting, by the controller, the configuration instructions to the at least one specific purpose processor; and transmitting, by the controller, instructions to the general purpose processor to transmit the configuration instructions to the at least one specific purpose processor.

In some cases, the controller is further configured to: route the data stream to at least one general purpose processor in communication with the data transmission network, wherein the at least one general purpose processor is configured to implement the data processing operation; determine that the at least one general purpose processor is operating substantially at processing load capacity; and route the data stream to the at least one specific purpose processor.

In some cases, the data stream comprises a media stream, and the data processing operation comprises at least one of: extracting a characteristic feature from the media stream, comparing one or more characteristic features extracted from one or more media streams to determine a synchronization error, adjusting one or more media streams to compensate for the synchronization error.

In some cases, the data transmission network is a software defined network which comprises a software defined network controller.

In some cases, the controller comprises the software defined network controller.

In some cases, the at least one specific purpose processor is a field programmable gate array (FPGA).

In another broad aspect, there is provided a system for processing data streams, comprising: a plurality data sources, wherein each data source generates a corresponding data stream, including a first data source that generates a first data stream and a second data source that generates a second data stream; a data transmission network, wherein each data source is coupled to the data transmission network, and the data transmission network is configured to receive the first data stream and the second data streams; a plurality of specific purpose processors in communication with the data transmission network, wherein each specific purpose processor is configured to provide a specific data processing operation; and a controller coupled the data transmission network, the controller configured to: determine that the first data stream requires processing according to a first data processing operation, wherein the first data processing operation is a comparatively low complex operation; identify a first data processing configuration corresponding to the first data processing operation; and route the first data stream to at least one first specific purpose processor of the plurality of specific purpose processors.

In some cases, the controller is further configured to control the first data source to generate the first data stream, and the second data source to generate the second data stream.

In some cases, the comparative complexity of the first data processing operation is determined based on at least one of the computing power required to implement the first data processing operation, the time required to implement the first data processing operation, the current system processing load, and the expected future system processing load.

In some cases, the at least one first specific purpose processor is configurable to implement the first data processing configuration by changing a hardware configuration of the at least one first specific purpose processor.

In some cases, the at least one first specific purpose processor is configurable to change the hardware configuration in response to receiving first configuration instructions for implementing the first data processing configuration.

In some cases, the controller is further configured to: determine that the second data stream requires processing according to a second data processing operation; identify a second data processing configuration corresponding to the second data processing operation; and route the second data stream to at least one second specific purpose processor of the plurality of specific purpose processors.

In some cases, the at least one second specific purpose processor of the plurality of specific purpose processors is configurable to implement the second data processing configuration by changing a hardware configuration of the at least one second specific purpose processor.

In some cases, the at least one second specific purpose processor is configurable to change the hardware configuration in response to receiving second configuration instructions for implementing the second data processing configuration.

In some cases, the system further comprises a plurality of general purpose processors in communication with the data transmission network, and wherein controller is further configured to: determine that the second data stream requires processing according to a second data processing operation, wherein the second data processing operation is a comparatively high complex operation; and route the second data stream to at least one general purpose processor of the plurality of general purpose processors.

In some cases, the comparative complexity of the second data processing operation is determined based on at least one of the computing power required to implement the first data processing operation, the time required to implement the first data processing operation, the current system processing load, and the expected future system processing load.

In some cases, the data transmission network is a software defined network which comprises a software defined network controller.

In some cases, the controller comprises the software defined network controller.

In some cases, the at least one specific purpose processor is a field programmable gate array (FPGA).

In another broad aspect, there is provided a method for processing data streams, comprising: determining, at a controller, that a first data stream generated by a data source requires processing according to a first data processing operation, wherein the first data processing operation is a comparatively low complex operation; identifying, by the controller, a first data processing configuration corresponding to the first data processing operation; and routing, by the controller, the first data stream through a data transmission network to at least one first specific purpose processor of a plurality of specific purpose processors which are connected to the data transmission network, wherein each of the plurality of specific purpose processors is configured to provide a specific data processing operation.

In some cases, the method further comprises controlling, by the controller, the first data source to generate the first data stream, and the second data source to generate the second data stream.

In some cases, the comparative complexity of the first data processing operation is determined based on at least one of the computing power required to implement the first data processing operation, the time required to implement the first data processing operation, the current system processing load, and the expected future system processing load.

In some cases, the method further comprises implementing, by the at least one first specific purpose processor, the first data processing configuration by changing a hardware configuration of the at least one first specific purpose processor.

In some cases, the method further comprises receiving, at the at least one first specific purpose processor, configuration instructions for changing the hardware configuration of the at least one first specific purpose processor to implement the first data processing configuration.

In some cases, the method further comprises: determining, by the controller, that the second data stream requires processing according to a second data processing operation; identifying, by the controller, a second data processing configuration corresponding to the second data processing operation; and routing, by the controller, the second data stream through the data transmission network to the at least one second specific purpose processor of the plurality of specific purpose processors.

In some cases, the method further comprises implementing, by the at least one second specific purpose processor, the second data processing configuration by changing a hardware configuration of the at least one second specific purpose processor.

In some cases, the method further comprises receiving, at the at least one second specific purpose processor, second configuration instructions for changing the hardware configuration of the at least one second specific purpose processor to implement the second data processing configuration.

In some cases, the system further comprises a plurality of general purpose processors in communication with the data transmission network, and wherein controller is further configured to: determining, by the controller, that the second data stream requires processing according to a second data processing operation, wherein the second data processing operation is a comparatively high complex operation; and routing, by the controller, through the data transmission network, the second data stream to at least one general purpose processor of a plurality of general purpose processors which are in communication with the data transmission network.

In some cases, the comparative complexity of the second data processing operation is determined based on at least one of the computing power required to implement the first data processing operation, the time required to implement the first data processing operation, the current system processing load, and the expected future system processing load.

In some cases, the data transmission network is a software defined network which comprises a software defined network controller.

In some cases, the controller comprises the software defined network controller.

In some cases, the at least one specific purpose processor is a field programmable gate array (FPGA).

In another broad aspect, there is provided a system for processing data streams, comprising: a plurality data sources, wherein each data source generates a corresponding data stream; a data transmission network, wherein each data source is coupled to the data transmission network; a plurality of specific purpose processors in communication with the data transmission network, wherein each specific purpose processor can be configured to provide a specific data processing operation; and a controller coupled the data transmission network, the controller configured to: determine that a first group of the data streams require processing according to a first data processing operation, wherein the first data processing operation is a comparatively low complex operation; identify a first data processing configuration corresponding to the first data processing operation; apply the first data processing configuration to a first group of one or more of the specific purpose processors; and route each of the data streams in the first group of data streams to a specific purpose processor in the first group of specific purpose processors.

In some cases, the comparative complexity of the first data processing operation is determined based on at least one of the computing power required to implement the first data processing operation, the time required to implement the first data processing operation, the current system processing load, and the expected future system processing load.

In some cases, the controller is further configured to apply the first data processing configuration to an additional one or more specific purpose processors to increase the number of specific purpose processors in the first group of specific purpose processors.

In some cases, the controller is further configured to apply the first data processing configuration to the additional one or more specific purpose processors when the controller determines the first group of one or more specific purpose processors is overloaded.

In some cases, the controller is further configured to: determine that a second group of the data streams require processing according to a second data processing operation; identify a second data processing configuration corresponding to the second data processing operation; applying the second data processing configuration to a second group of one or more of the specific purpose processors; and route each of the data streams in the second group of data streams to a specific purpose processor in the second group of specific purpose processors.

In some cases, the system further comprises a plurality of general purpose processors in communication with the data transmission network, and the controller is further configured to: determine that a second group of the data streams require processing according to a second data processing operation, wherein the second data processing operation is a comparatively high complex operation; and route each of the data streams in the second group of data streams to at least one general purpose processor in the plurality of general purpose processors.

In some cases, the comparative complexity of the second data processing operation is determined based on at least one of the computing power required to implement the first data processing operation, the time required to implement the first data processing operation, the current system processing load, and the expected future system processing load.

In another broad aspect, there is provided a method for processing data streams, comprising: determining, by a controller, that a first group of the data streams generated by at least one data source requires processing according to a first data processing operation, wherein the first data processing operation is a comparatively low complex operation; determining, by the controller, that a first group of the data streams require processing according to a first data processing operation, wherein the first data processing operation is a comparatively low complex operation; applying, by the controller, the first data processing configuration to a first group of one or more of the specific purpose processors; and routing, by the controller, each of the data streams in the first group of data streams to a specific purpose processor in the first group of specific purpose processors through a data transmission network.

In some cases, the comparative complexity of the first data processing operation is determined, by the controller, based on at least one of the computing power required to implement the first data processing operation, the time required to implement the first data processing operation, the current system processing load, and the expected future system processing load.

In some cases, the method further comprises applying, by the controller, the first data processing configuration to an additional one or more specific purpose processors in the plurality of specific purpose processors to increase the number of specific purpose processors in the first group.

In some cases, the method further comprises: determining, by the controller, that the first group of one or more specific purpose processors is operating substantially at processing load capacity; and applying, by the controller, the first data processing configuration to the additional one or more specific purpose processors.

In some cases, the method further comprises: determining, by the controller, that a second group of the data streams require processing according to a second data processing operation; identifying, by the controller, a second data processing configuration corresponding to the second data processing operation; applying, by the controller, the second data processing configuration to a second group of one or more of the specific purpose processors; and routing, by the controller, through the data transmission network, each of the data streams in the second group of data streams to a specific purpose processor in the second group of specific purpose processors.

In some cases, the method further comprises: determining, by the controller, that a second group of the data streams require processing according to a second data processing operation, wherein the second data processing operation is a comparatively high complex operation; and routing, by the controller, through the data communication network, each of the data streams in the second group of data streams to at least one general purpose processor in a plurality of general purpose processors which are in communication with the data communication network.

In some cases, the comparative complexity of the second data processing operation is determined by the controller based on at least one of the computing power required to implement the first data processing operation, the time required to implement the first data processing operation, the current system processing load, and the expected future system processing load.

In another broad aspect, there is provided a system for processing data streams, comprising: at least one data source for transmitting a data stream to a data transmission network; at least one specific purpose processor in communication with the data transmission network; at least one general purpose processor in communication with the data transmission network, wherein the generally purpose processor is configured to provide a data processing operation; a controller coupled the data transmission network, the controller configured to: determine that the data stream requires processing according to the data processing operation; route the data stream to the at least one general purpose processor; determine that a load requirement for processing the data stream exceeds a processing load capability of the at least one general purpose processor; and route the data stream to the at least one specific purpose processor.

In some cases, the at least one specific purpose processor is configurable to implement a data processing configuration corresponding to the data processing operation by changing a hardware configuration of the at least one second specific purpose processor.

In some cases, the at least one second specific purpose processor is configurable to change the hardware configuration to implement the data processing operation, in response to receiving configuration instructions for implementing the data processing configuration.

In another broad aspect, there is provided a method for processing data streams, comprising determining, by a controller, that a data stream transmitted by at least one data source to a data transmission network requires processing according to a data processing operation; routing, by the controller, the data stream to the at least one general purpose processor in communication with the data transmission network; determining, by the controller, that a load requirement for processing the data stream exceeds a processing load capability of the at least one general purpose processor; and routing, by the controller, the data stream to at least one specific purpose processor in communication with the data transmission network.

In some cases, the method further comprises, prior to routing the data stream to the at least one specific purpose processor, implementing, by the at least one specific purpose processor, a data processing configuration corresponding to the data processing operation by changing a hardware configuration of the at least one second specific purpose processor.

In some cases, the method further comprises, at the at least one specific purpose processor, configuration instructions for changing the hardware configuration of the at least one specific purpose processor to implement the data processing configuration.

BRIEF DESCRIPTION OF THE DRAWINGS

Embodiments of the present invention will now be described in detail with reference to the drawings, in which.

Figure 1:
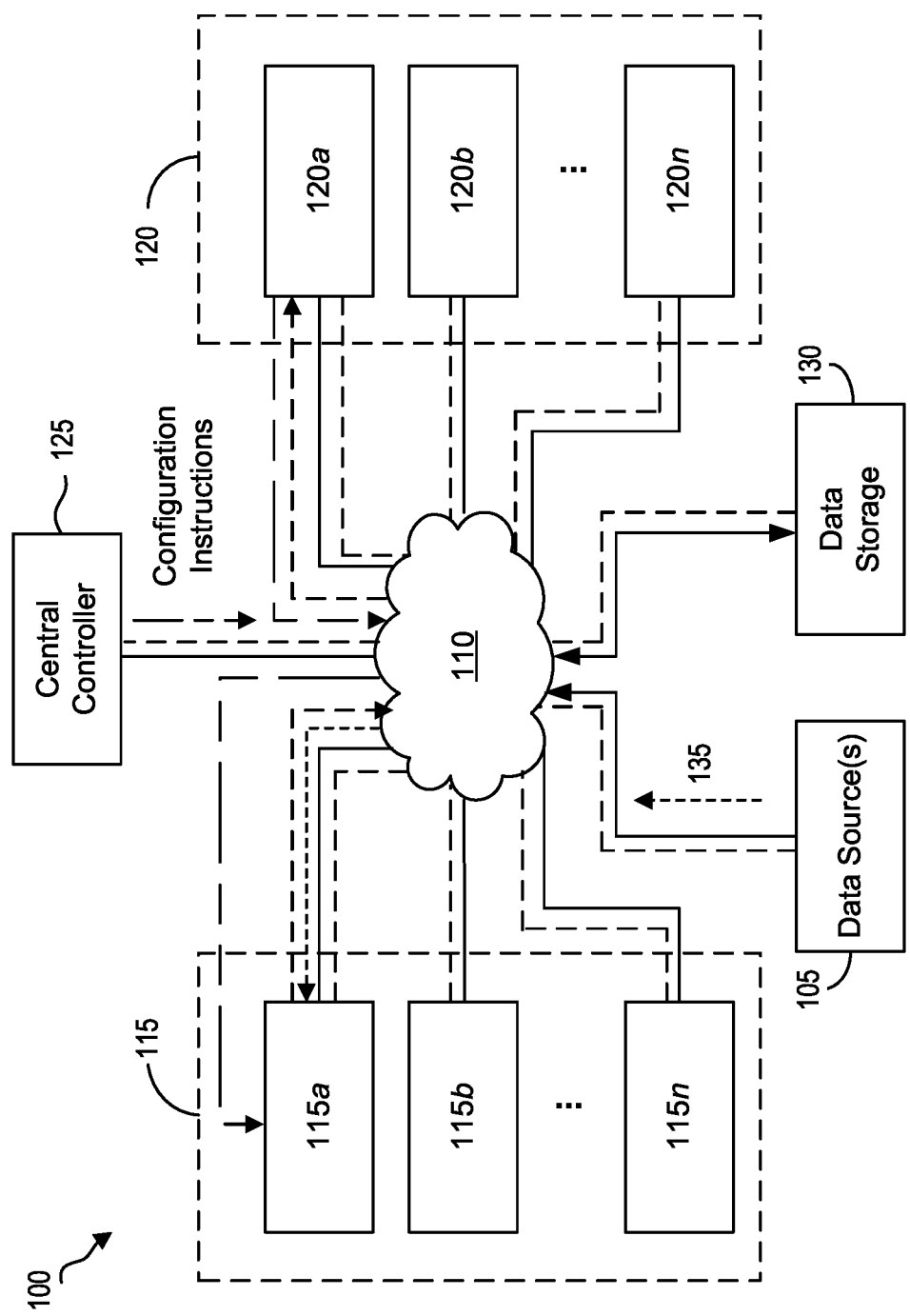
FIG. 1 is an example block diagram of a system for processing data streams, in accordance with at least some embodiments.

The drawings, described below, are provided for purposes of illustration only of, and without limiting, the aspects and features of various examples of embodiments described herein. For simplicity and clarity of illustration, elements shown in the drawings have not necessarily been drawn to scale. The dimensions of some of the elements may be exaggerated relative to other elements for clarity. It will be appreciated that for simplicity and clarity of illustration, where considered appropriate, reference numerals may be repeated among the drawings to indicate corresponding or analogous elements or steps.

DESCRIPTION OF EXEMPLARY
EMBODIMENTS

Numerous specific details are set forth in order to provide a thorough understanding of the example embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description and the drawings are not to be considered as limiting the scope of the embodiments described herein in any way, but rather as merely describing the implementation of the various embodiments described herein.

It should be noted that terms of degree such as "substantially", "about" and "approximately" when used herein mean a reasonable amount of deviation of the modified term such that the end result is not significantly changed. These terms of degree should be construed as including a deviation of the modified term if this deviation would not negate the meaning of the term it modifies.

In addition, as used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

Reference throughout this specification to "one embodiment" or "an embodiment" means that a particular feature, structures, or characteristics may be combined in any suitable manner in one or more embodiments.

It should be noted that the term "coupled" used herein indicates that two elements can be directly coupled to one another or coupled to one another through one or more intermediate elements. Furthermore, the term "body" typically refers to the body of a patient, a subject or an individual who receives the ingestible device. The patient or subject is generally a human or other animal.

Throughout this specification and the appended claims, infinitive verb forms are often used. Examples include, without limitation: "to detect," "to provide," "to transmit," "to communicate," "to process," "to route," and the like. Unless the specific context requires otherwise, such infinitive verb forms are used in an open, inclusive sense, that is as "to, at least, detect," to, at least, provide," "to, at least, transmit," and so on.

The embodiments of the systems and methods described herein may be implemented in hardware or software, or a combination of both. These embodiments may be implemented in computer programs executing on programmable computers, each computer including at least one processor, a data storage system (including volatile memory or nonvolatile memory or other data storage elements or a combination thereof), and at least one communication interface. For example and without limitation, the programmable computers may be a server, network appliance, embedded device, computer expansion module, a personal computer, laptop, personal data assistant, cellular telephone, smartphone device, tablet computer, a wireless device or any other computing device capable of being configured to carry out the methods described herein.

In some embodiments, the communication interface may be a network communication interface. In embodiments in which elements are combined, the communication interface may be a software communication interface, such as those for inter-process communication (IPC). In still other embodiments, there may be a combination of communication interfaces implemented as hardware, software, and combination thereof.

Program code may be applied to input data to perform the functions described herein and to generate output information. The output information is applied to one or more output devices, in known fashion.

Each program may be implemented in a high level procedural or object oriented programming and/or scripting language, or both, to communicate with a computer system. However, the programs may be implemented in assembly or machine language, if desired. In any case, the language may be a compiled or interpreted language. Each such computer program may be stored on a storage media or a device (e.g. ROM, magnetic disk, optical disc) readable by a general or special purpose programmable computer, for configuring and operating the computer when the storage media or device is read by the computer to perform the procedures described herein.

Embodiments of the system may also be considered to be implemented as a non-transitory computer-readable storage medium, configured with a computer program, where the storage medium so configured causes a computer to operate in a specific and predefined manner to perform the functions described herein.

Furthermore, the system, processes and methods of the described embodiments are capable of being distributed in a computer program product comprising a computer readable medium that bears computer usable instructions for one or more processors. The medium may be provided in various forms, including one or more diskettes, compact disks, tapes, chips, wireline transmissions, satellite transmissions, internet transmission or downloadings, magnetic and electronic storage media, digital and analog signals, and the like. The computer useable instructions may also be in various forms, including compiled and non-compiled code.

Some elements herein may be identified by a part number, which is composed of a base number followed by an alphabetical or subscript-numerical suffix (e.g. 112a, or 112$_1$). Multiple elements herein may be identified by part numbers that share a base number in common and that differ by their suffixes (e.g. 112$_1$, 112$_2$, and 112$_3$). All elements with a common base number may be referred to collectively or generically using the base number without a suffix (e.g. 112).

I. General System Overview

Reference is first made to FIG. 1, which illustrates an example block diagram of a system 100 for processing data streams, in accordance with at least some embodiments.

System 100 generally includes a data source 105 connected, via network 110, to one or more specific purpose processors 115a-115n, one or more general purpose processors 120a-120n, controller 125 and data storage 130.

Data source 105 can be any source of data streams 135 into network 110. While a single data source 105 is illustrated, it will be appreciated that any number of data sources 105 can be provided, each being a source of one or multiple data streams 135.

The content of data streams 135 can vary based on the function of system 100. For example, system 100 can be a system for processing media data, and accordingly, data streams 135 can comprise media streams. The media streams can include one or more of audio, video and metadata content. In other example embodiments, system 100 can be a system for processing financial or stock market data, and accordingly, data source 105 can be a source of data streams for financial or stock market information. In some other example cases, system 100 can be a system that receives and processes multiple types of data received from multiple types of data sources.

Data source 105 can include one or more devices that generate the data streams 135. For example, data streams 135 can comprise media streams, and data source 105 can be a microphone that generates audio streams and/or a camera that generates video streams. In other embodiments, data source 105 can be an intermediate processing device, which receives data streams from other upstream components, and transmits the processed data streams to network 110. In still other example cases, data source 105 can be a device that merely forwards data streams from other upstream components.

In some cases, data source 105 can automatically transmit data streams to the network 110. For example, system 100 can be part of a broadcast production system for live programming content (e.g., live television programs, or live sports games), and data sources 105 (e.g., cameras, microphones) can automatically transmit live media streams to network 110. Similarly, data source 105 can be a source that automatically transmits live financial or stock market data.

In other embodiments, data source 105 can generate and/or transmit data streams, into network 110, only in response to receiving control instructions from controller 125. For example, controller 125 can transmit instructions, via network 110, to data source 105 to transmit data streams to network 110 at pre-defined time intervals or at pre-defined frequency intervals.

In at least some embodiments, data source 105 can also transmit information to controller 125 regarding processing requirements for data streams. The processing requirements can be based on certain factors, such as, the types of processing operations required to be performed on the data streams, the complexity of the processing operations, the data streams' processing priorities etc. In some cases, processing requirement information can be provided in-band within the data streams. In other cases, the processing requirement information can be provided out-of-band, or separately from the data streams. For example, data source 105 can transmit processing requirement information to controller 125 out-of-band before or after transmitting the data streams to network 110.

Data source 105 can also transmit destination information for data streams to controller 125. Destination information can identify destination devices located inside or outside of system 100 that receive the data streams. The destination information can be provided in various formats, such as, for example, an Internal Protocol (IP) address for a destination device. The destination information can also be provided in-band, or out-of-band, from the data streams. Controller 125 can use the destination information to route the data streams to one or more desired destination devices.

In some cases, data source 105 can transmit information to controller 125 in respect of data streams which are expected (e.g., scheduled) to be transmitted at a future point in time. For instance, data source 105 can connect to a video production system for generating live television content. The data source 105 can transmit live television content within pre-determined time intervals. Accordingly, data source 105 can inform controller 125 regarding the time intervals in which live media content is to be transmitted. Controller 125 can then allocate processing resources in advance to receive and process the live media streams.

Network 110 can be any communication network that allows transmission of data streams and control signals between different components of system 100. Network 110 can comprise, for example, an Internet Protocol (IP) network, and can include multiple network paths, as well as one or more network switches that configure the one or more network paths to route data streams to different destination devices inside of system 100. In some cases, network 110 can also route data streams to devices located outside of system 100. For instance, network 110 can communicate with other networks, external to system 100, in order to route data stream to the external networks.

In some embodiments, network 110 can be a software defined network (SDN). The SDN can include a data plane and a control plane. The data plane can include network switches and routing nodes that route data streams to different destination devices. The control plane can include one or more controllers (e.g., SDN controllers) to control the data plane. The one or more SDN controllers can control network switches to route data streams to different devices inside, or outside, system 100.

In some embodiments, the SDN controller can receive information from the data plane. For example, this can include receiving information in respect of the network traffic load at each data plane device. The SDN controller can use this network traffic information to re-optimize network traffic flow. For example, based on network traffic information, the SDN controller can re-route data streams in high traffic network paths to low traffic network paths in order to re-optimize network traffic flow.

The SDN controller can also re-optimize network traffic flow based on data streams' processing priority requirements. For example, high priority data streams can be routed through low traffic network paths, while low priority data streams can be routed through higher traffic network paths.

In some embodiments, the SDN controller can be the same as the central controller 125. In other embodiments, the SDN controller can be separate from the central controller 125 (not shown), but operate in collaboration with the central controller 125. In these cases, the SDN controller can be any suitable processor, including a digital signal processor, a graphics processing unit, or an application specific integrated circuit (ASIC).

In embodiments where the SDN controller is separate from controller 125, the SDN controller can receive instructions from central controller 125. For example, central controller 125 can transmit instructions to the SDN controller to route data streams to specific destination devices. The SDN controller can then control the data plane to route the data streams to the desired destination devices.

In cases where the SDN controller is separate from controller 125, central controller 125 can also transmit information to the SDN controller regarding processing priorities for different data streams. Based on this information, the SDN controller can re-optimize traffic flow to re-route high priority data streams through low traffic network paths, and low priority data streams though high traffic network paths.

Where the SDN controller is separate from controller 125, the SDN controller can route all, or a portion, of incoming data streams, inside network 110, to the central controller 125. Routing data streams to central controller 125 can allow central controller 125 to analyze the data streams to determine, for example, each data streams' processing and destination requirements. In some cases, incoming data streams can be automatically routed by the SDN controller to controller 125. In other cases, incoming data streams can be routed by the SDN controller to controller 125 only in response to receiving a request from controller 125.

In view of the foregoing, it will be appreciated that a benefit of using an SDN network—with a configurable software-controlled data plane—is to provide more controlled, centralized network provisioning for the entire system (e.g., via an SDN controller or controller 125) by allowing more granular co-ordination for routing of data streams between various components of the system, and in turn, efficiently processing large volumes of data streams, as may be required where the system 100 is part of—for example—a large broadcast production facility. In various cases, an SDN network also allows a controller (or administrator) to more efficiently control the network by controlling which processing devices are activated (e.g., designated to receive data streams), or de-activated (e.g., designated to receive no data streams). In this manner, the SDN network can facilitate a number of methods described herein.

Network 110 can also comprise any other suitable type of network, including other networks having separate, or combined, control and data planes.

Specific purpose processors 115a-115n can include processors configured to handle specific processing tasks. For example, each specific purpose processor 115 can handle a single specific processing task, or multiple specific processing tasks (e.g., a workflow of processing tasks).

The specific purpose processors 115 can include, for example, a field programmable gate arrays (FPGA) (e.g., an SRAM-based FPGA), or otherwise, any other processor having a flexible hardware (e.g., circuit) configuration, including various types of field programmable devices (FPDs) or programmable logic devices (PLDs) such as programmable logic arrays (PLA), programmable array logic (PAL) boards, simple PLDs (SPLD) and/or complex PLDs (CPLD), by way of non-limiting examples.

In various embodiments, each specific purpose processor 115 can be configurable, or re-configurable (e.g., by controller 125), to perform data processing tasks (e.g., new or different data processing tasks). In particular, as explained herein, each specific purpose processor 115 can have a hardware configuration (e.g., circuit configuration) which is configurable, or re-configurable, to allow the specific purpose processor 115 to perform additional data processing tasks, different data processing tasks than previously performed, or substitute old data processing tasks for new data processing tasks. Alternately or in addition, the specific purpose processor 115 may be re-configurable to provide an updated version of an existing processing task. In various cases, the specific purpose processors 115 may be configurable or re-configurable by virtue of them having various programmable (or re-programmable) logic blocks for implementing various logic functions (e.g., including programmable flip-flops, multiplexers and look-up tables, etc.), as well as programmable input/output blocks and/or programmable interconnects between logic blocks (e.g., switch matrices), which can be programmed to configure or re-configure—wholly or partially—the specific purpose processors' hardware configuration.

In some cases, only a portion (e.g., a sub-circuit portion) of the specific purpose processor can be configurable, or re-configurable. Alternately, the entire specific purpose processor may be re-configurable, although it may still be possible to re-configure only a portion of the specific purpose processor. In some cases, multiple specific purpose processors may be configured, or re-configured, as a group. This may occur, for instance, where a plurality of specific purpose processors are configured to perform the same processing operation (e.g. to provide parallel processing operations).

The configurability, or re-configurability, of one or more specific purpose processors 115 can be dynamically performed without requiring a partial or full system wide shut-down or re-initialization. In other words, the specific purpose processors 115 can be configured, or re-configured, in real-time while the system 100 is operational or "hot" (i.e., in real-time, or near real-time).

As explained in further detail herein, the hardware configuration of each specific purpose processor 115 can be modified (e.g., configured or re-configured) in response to configuration instructions received from other components of system 100 (e.g., controller 125, general purpose processor 120 or data storage 130), as well as configuration instructions retrieved from an embedded (or accessible) memory of each specific purpose processor 115. In at least some embodiments, the configuration instructions can include configuration data comprising a string of binary bits which program (or re-program), for example, the one or more programmable logic blocks, input/output blocks and interconnects of a specific purpose processor 115. For example, the configuration instructions can include binary bit streams which determine high or low (i.e., ON or OFF, or high voltage or low voltage) states for different logic switches located in various programmable logic components of the specific purpose processors 115. Other example types of configuration instructions are also provided in further detail herein.

In various embodiments, specific purpose processors 115 can be configured or re-configured (e.g., by controller 125) to perform high frequency tasks (e.g., re-occurring processing tasks). In particular, the specialized nature of the specific purpose processors can be suited for quick performance of routine data processing operations. In other cases, the specific purpose processors 115 can be configured, or re-configured, to perform processing tasks requiring low processing complexity. Low complexity tasks can include tasks that require, for example, low processing power, or low processing time (e.g., a task that can be completed below a pre-determined amount of processing time and/or power). In particular, specific purpose processors 115, such as FPGAs, can be suited for low complexity operations owing to their limited on-chip memory capability.

In some embodiments, specific purpose processors 115 can be configured to store and transmit (e.g., to central controller 125) data processing configuration information or data. Data processing configuration information can include, for example, the data processing tasks being handled (e.g., processed) by the specific purpose processor 115. In other cases, data processing configuration information can include information about the programmed state of various programmable logic components in the processor. In still other cases, data processing configuration information can correspond to a particular mode of operation of the specific purpose processor 115 (e.g., that the processor is configured to generate specific outputs and/or receive specific inputs). In some example cases, data processing configuration information can allow a controller 125 to monitor the operation of each specific purpose processor 115 in the system.

In general, the specific purpose processors 115 can receive data streams from network 110, or directly from other upstream devices. The data streams are processed by the specific purpose processors 115, and are transmitted back to network 110 or other downstream devices (inside or outside of system 100). Data streams transmitted to network 110 by the specific purpose processes 115 are routed, by controller 125, to other processors or other devices (e.g., inside or outside system 100). In some embodiments, each specific purpose processor 115 may only transmit a processed data stream back to network 110, or other downstream devices, in response to receiving instructions (e.g., permission) from the central controller 125.

Each specific purpose processor 115 can also include an internal or externally accessible memory buffer (not shown). The memory buffer temporarily stores incoming data streams requiring processing. The memory buffer can store multiple data streams requiring sequential processing, or multiple data streams requiring simultaneous processing. For example, in cases where multiple data streams require simultaneous processing, the data streams can be received at different times, or at different rates. Accordingly, the memory buffer can store media streams until all media streams that require simultaneous processing are received by the specific purpose processor 115. The specific purpose processor 115 can then act on all multiple data streams simultaneously.

In various cases, the specific purpose processor 115 may also have access to a memory storage (e.g., internal or external memory storage) for storing data that may also be otherwise required for data processing.

General purpose processors 120a-120n are processors which generally handle a large variety of processing tasks, and have greater processing capability than specific purpose processors 115. Examples of general purpose processors 120 can include central processing units (CPU) or graphic processing units (GPU). In some embodiments, one or more general purpose processors 120 can comprise central processing units (CPUs) modeled on an x86 architecture.

In various embodiments, the general purpose processors 120 are operable to execute software programs which perform the different data processing tasks. The software programs can be stored, for example, on a memory (e.g., an embedded memory, or an externally accessible memory) of the general purpose processors 120. The general purpose processors 120 can execute a single software program that performs a range of data processing tasks, or separate software programs which perform different processing tasks. In particular, and in contrast to the specific purpose processors 115, the general purpose processor 120 is able to execute new or different processing tasks by executing the same or different software programs (e.g., executing executable instructions associated with a software program), rather than necessarily physically altering the processors' hardware (e.g., altering programming of physical switch or logic components) as is the case with specific purpose processors 115.

In at least some embodiments, the general purpose processors 120 can receive instructions from central controller 125 to implement data processing operations. In response to these instructions, the general purpose processors 120 can execute software programs that implement the requested data processing operations.

In embodiments provided herein, general purpose processors 120 can be suited for performing high complexity processing tasks that are otherwise difficult to perform on specific purpose processors 115.

In particular, as the general purpose processors 120 are not specifically configured to perform particular processing operations, the general purpose processors 120 may, in some example cases, process the data streams more slowly than the specific purpose processors 115. The specific purpose processors 115 may be particularly adept at performing the processing operations for which they are configured due to they being specifically configured to perform those specific processing operations. Accordingly, the specific purpose processors 115 may be capable of performing these processing operations with greater efficiency than the general purpose processors 120. For instance, the specific purpose processors 115 may be particularly well suited to perform high priority or urgent processing tasks requiring immediate and fast processing, as well as high frequency processing tasks, high throughput tasks, tasks which require high parallel processing or high processing bandwidth, specialized tasks that require high computation power, or tasks which require performance in a highly energy efficient manner. In such cases, the general purpose processors 120 may be designated by controller 125 to perform primarily low priority tasks, as well as processing tasks that are low in frequency.

Similar to specific purpose processors 115, each general purpose processor 120 can receive data streams either from network 110 or other upstream components. The general purpose processors 120 can process the data streams to generate processed data streams. The processed data stream can be transmitted to network 110, or otherwise, to other downstream devices inside or outside of system 100. The data steams can be transmitted automatically, or only in response to receiving instructions from controller 125.

Each general purpose processor 120 can also include a memory buffer to temporarily store received data streams. Similar to specific purpose processors 115, the memory buffer can buffer data streams requiring consecutive or simultaneous processing.

In some cases, each general purpose processors 120 can be configured to transmit information (e.g., to controller 125) in respect of the types of data processing operations being handled by the general purpose processor 120. This, in turn, can assist the controller 125 in monitoring tasks being performed by each general purpose processor 125 in the system.

Data storage 130 can include one or more computer servers, each of which can include a storage memory, a processor, and a network interface. The storage memory can comprise a random access memory (RAM), a read-only memory (ROM), an erasable programmable read-only memory (EPROM, EEPROM, or Flash memory), one or more hard drives, or other suitable data storage elements. The data storage 130 can also be a cloud storage and can include a number of servers, or computer nodes, connected via a network.

In some embodiments, data storage 130 can store data streams transmitted through network 110. For example, controller 125 can route data streams from data source 105 to data storage 130 for storage, and subsequent processing at a later point in time. Data storage 130 can also store data streams processed by one or more processors 115, 120. For example, data streams may undergo processing by one or more processors 115, 120, and can be stored at data storage 130 for later use, e.g. for subsequent processing, or subsequent transmission to other downstream devices.

In still other embodiments, data storage 130 can also store configuration instructions for specific purpose processors 115. The configuration instructions can be instructions previously generated by controller 125, general purpose processor 120, or other devices located inside or outside of system 100. The configuration instructions can be stored on data storage 130 for retrieval at a subsequent time by controller 125.

Central controller 125 can be configured to manage the flow of data inside of system 100. For example, network 110 can be an SDN network, and controller 125 can act as an SDN controller. Accordingly, controller 125 can manage the flow of data by controlling an SDN data plane (e.g., network switches) to route data to desired destination devices located inside or outside of system 100. In other cases, the SDN network can include an independent SDN controller. Accordingly, controller 125 can transmit instructions to the SDN controller to route data streams to various destination devices. Controller 125 may also be configured to perform one or more functions, operations and methods as described in greater detail herein (e.g., methods 400a-400h in FIGS. 4A-4H).

Figure 2:
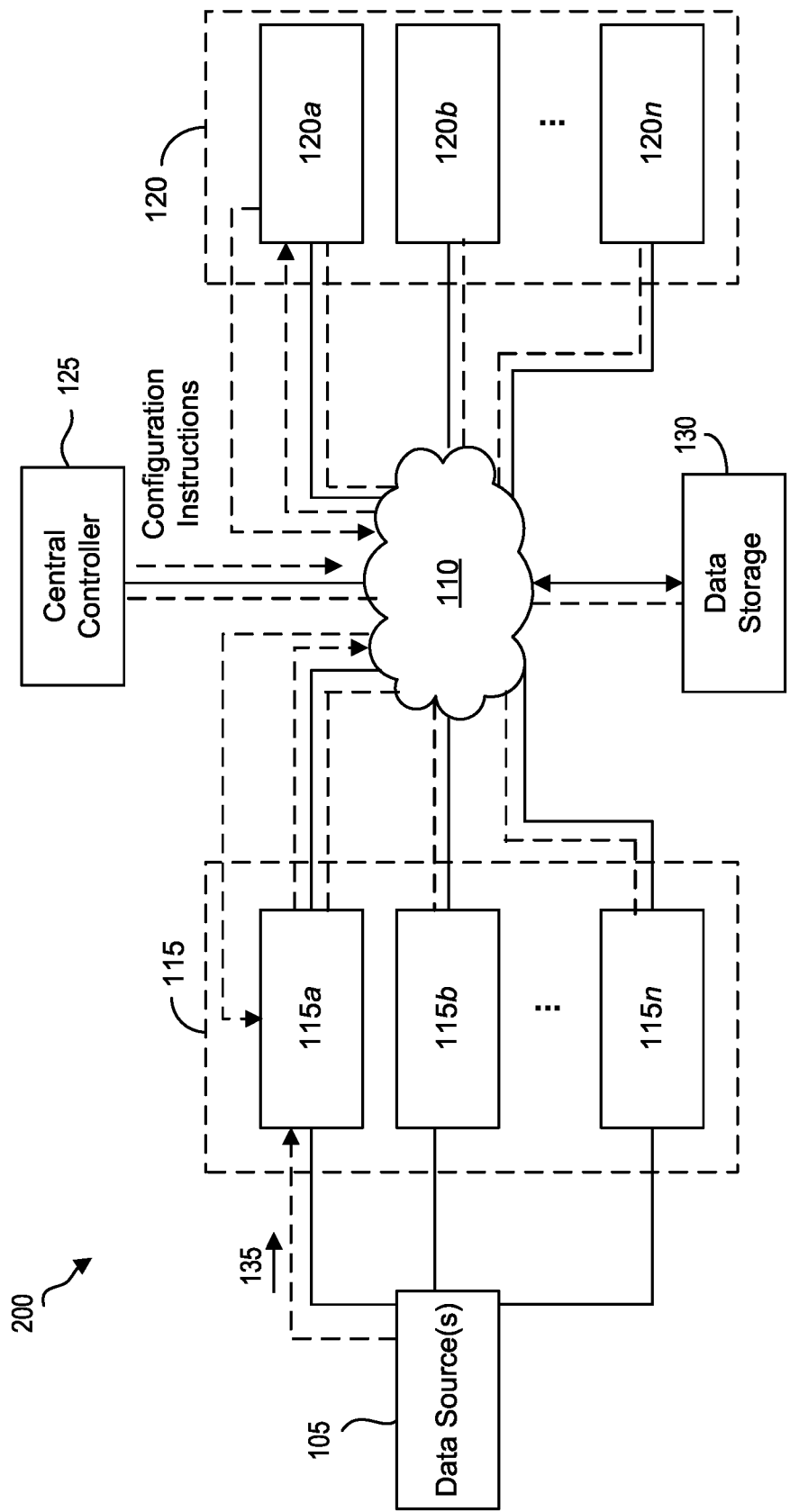
FIG. 2 is an example block diagram of a system for processing data, in accordance with other embodiments.

Reference is now made to FIG. 2, showing therein a block diagram of a system 200 for processing data, in accordance with another embodiment.

Similar to system 100 of FIG. 1, system 200 generally includes a central controller 125 in communication, via network 110, with one or more specific purpose processor 110a-110n, one or more general purpose processor 115a-115n and a data storage 130. However, in contrast to system 100, the data source 105 in system 200 is now in direct communication with one or more specific purpose processors 115. In particular, in this example embodiment, in addition to operating on data streams located inside the network 110, the specific purpose processors 115 can also operate on data streams from data sources 105 before the data streams are transmitted to network 110 (i.e., the specific purpose processors 115 may perform one or more initial pre-processing operations to the data streams). In some embodiments (not shown), some data sources 105 may be coupled to one or more specific purpose processors 115 which pre-processes data streams from these data sources 105, while other data sources 105 may be directly coupled to the network 110.

II. Managing Routing of Data Streams by Central Controller

To manage processing of data streams inside of system 100, in various embodiments, central controller 125 may be configured to designate one or more processors to receive and process relevant data streams, and may also control routing (or re-routing) of data streams to the designated processors. In at least some embodiments, controller 125 may designate processors to receive data streams, as well as route (or re-route) data streams to designated processors, dynamically and in real-time or near real-time, e.g. while the system 100 is operational or 'hot'.

As provided herein, central controller 125 can designate processors to receive data stream based on a number of factors. For example, the central controller 125 can designate various processors to receive data streams based on the processing availability of processors in the system. In some other cases, the central controller 125 can designate various processors to receive data streams based on processing operations required for each data stream. In yet some other cases, the central controller 125 can designate various processors to receive data streams based on the complexity of the processing operations required to be performed on the data streams. In some further cases, the central controller 125 can designate various processors to receive data streams based on the processing priorities of the various data streams. In still some further cases, the central controller 125 can designate processors to receive data streams based on the frequency of operations required to be performed on the data streams.

(i) Designating Processors Based on Processing Availability

In at least some embodiments, controller 125 can designate processors to receive data streams based on the processing availability of processors inside the system 100. For example, controller 125 can route incoming data streams to high availability processors, while routing data streams away from low availability processors. As used herein, processing availability refers to the computational and memory resource availability of a processor. Further, a processor having a high processing availability (or a 'high availability processor') is any processor having at least sufficient memory and/or computational resource power to accommodate execution of a necessary data processing operation.

In various cases, to determine the processing availability of a processor, controller 125 can use information transmitted by each processor 115, 120 to controller 125. For example, each processor 115, 120 can transmit information to controller 125 regarding its current processing load, as well as its future or expected processing load. In particular, the future processing load can correspond, for example, to the number of data streams awaiting processing by the processor (e.g., the number of data streams inside the processor's memory buffer). In some cases, processing availability information is automatically transmitted to controller 125 by each processor 115, 120 (e.g., automatically transmitted to controller 125 continuously, or at pre-defined time or frequency intervals). In other cases, processing availability information may be transmitted by processors 115, 120 only in response to a request by controller 125.

In other embodiments, controller 125 can also determine at least a processor's current processing load by monitoring the number of data streams previously routed by the controller 125 to each processor, and/or the number of processed data streams, in turn, generated (e.g., output) by each processor. Accordingly, based on this monitoring, controller 125 can calculate the number of data streams still being currently processed by the processor. Controller 125 can also determine a processor's future processing load based on known information about the number of data streams expected (e.g., scheduled) to be transmitted at a future point in time to a processor. For example, controller 125 can receive information from data source 105 (or other system components) regarding expected or future incoming data streams, and may determine that these data streams are normally routed to certain processors. In this manner, the expected or future incoming data streams for those processors may be used to determine their future processing load.

In addition or in the alternative to routing incoming data streams to processors based on their availability, controller 125 can also re-route data streams, inside the system 100, between processors so as to perform load balancing and load optimization between processors to accommodate different processors' availabilities.

For example, in at least some example cases, controller 125 can determine that one or more specific purpose processors 115 and/or general purpose processors 120 is operating at, or near, maximum processing capacity, or otherwise, is expected to operate at, or near, processing capacity. In response, to reduce the processing load on the overcapacity processors, controller 125 can identify the processing operations being performed by the overcapacity processors. Controller 125 can then identify one or more processors (e.g., specific purpose processors 115 or general purpose processors 120) having high processing availability, and which are configured (or adapted) to perform the required processing operations. Controller 125 can then designate the high availability processors to receive all, or some, of the data streams from the overcapacity processors, and re-route the data streams from the overcapacity processors to the high availability processors. In this manner, controller 125 can reduce the processing load for the overcapacity processor and translate at least some of the processing load to one or more high availability processors.

(ii) Designated Processors Based on Processing Requirements of Data Streams

Controller 125 can also designate processors in system 100 to receive data streams based on the processing operations required to be performed on each data stream.

For example, in some cases, controller 125 can determine that one or more incoming data streams require one or more particular data processing operations. Controller 125 can then identify one or more specific purpose processors 115 that are configured to perform the required data processing operations. For instance, as stated previously, controller 125 can receive data processing configuration information from each specific purpose processor 115, which indicates the processing operations that the specific purpose processor 115 is configured for. In other cases, controller 125 can maintain a database of processing functions (e.g., configurations) performed by each specific purpose processor 115. Controller 125 can then designate the one or more identified specific purpose processors 115 to receive and process the data streams.

In other cases, controller 125 can also designate one or more general purpose processors 120 to receive and process the data streams.

In some example cases, a data stream may require more than one data processing operation (e.g., a workflow of data processing operations). Accordingly, controller 125 may designate more than one processor to receive the data stream, wherein each processor may be designated to perform one or more sub-operations of the workflow of operations. The controller 125 may then sequentially re-route the data stream between designated processors in accordance with the processing workflow.

Controller 125 can use various ways to determine the processing operation requirements of incoming data streams in order to designate one or more relevant processors to receive and process the data stream.

For example, in some embodiments, controller 125 can access each data stream, and analyze the contents of the data streams, to determine the required processing operations. For example, system 100 can be a system for processing media streams, such as video streams. Controller 125 can analyze the video streams to determine that the video streams require video property adjustments. For example, controller 125 can identify certain properties of the video signal contained in the data stream, such as the color balance, brightness, contrast, resolution, frame rate etc. Controller 125 can then compare the identified video property to a pre-determined reference value known to the controller 125 (e.g., a minimum brightness or contrast), and determine that a video property adjustment is required. Controller 125 can then allocate one or more processors (e.g., specific purpose processors 115), which are configured to perform the video property adjustment, to receive the video stream.

In other cases, the media streams can be audio streams. In these cases, controller 125 can analyze the audio streams to determine that a correction is required to an audio property. For example, certain properties of audio signal, such as the volume, sampling rate, equalization, or balance of the audio streams can require correction. Accordingly, controller can allocate processors (e.g., specific purpose processors 115) configured to perform the audio correction to receive the audio streams.

Similarly, a metadata stream can require a correction to the metadata format or structure. Accordingly, controller 125 can also designate processors (e.g., specific purpose processors 115) to receive the metadata streams, and perform the required correction.

Controller 125 can also determine the processing operations required to be performed on data streams based on the data source 105 transmitting the data stream. For example, data streams transmitted by specific data sources 105 can require pre-determined data processing operations (e.g., audio streams from a microphone can require specific audio equalization operations).

In some cases, controller 125 can also receive processing operation information for data streams directly from data source 105. For example, data source 105 can automatically transmit information regarding processing operations required for transmitted data streams to controller 125, or otherwise, controller 125 can query the information from data source 105.

In still some other embodiments, controller 125 can determine the type of processing operations required for one or more data streams based on the destination devices receiving the data streams. For example, controller 125 can identify a destination device for a data stream (e.g., a destination IP address, which may be provided by data source 105 in-band or out-of-band from the data stream). Controller 125 can then determine that the destination device requires data streams to undergo pre-determined processing operations. Accordingly, controller 125 can designate processors, which perform the required processing operations, to receive and process the data streams.

(iii) Designating Processors based on Complexity of the Processing Operations Required to be Performed on Data Streams In some cases, controller 125 can also designate processors to receive data streams based on the complexity of the processing operations required to be performed on the data streams.

The complexity of a processing operation can correspond, for example, to the computational power and/or computational time required to perform a processing operation. In some cases, controller 125 can determine the complexity of a processing operation based on the type of processing operation required to be performed. For example, controller 125 may be configured to determine that specific types of operations are generally known to be high complexity or low complexity operations. In other cases, complexity information may be provided to the controller 125 by a third-party source (e.g., data source 105).

In some cases, the controller 125 can be configured to assign higher complexity operations to general propose processors 120 owing to their greater processing power, while assigning lower complexity operations to specific purpose processor 115 due to their more limited processing capability. Controller 125 accordingly designates general purpose processors 120 to receive data streams requiring higher complexity operations. Controller 125 routes data streams requiring lower complexity operations to specific purpose processors 115 that are configured to perform the necessary processing operations.

In some cases, a data stream may require a workflow of high and low complexity operations, whereby the high and low complexity operations may be performed by different processors. Accordingly, in these cases, controller 125 can re-route the data stream between the general purpose 120 and specific purpose 115 processors based on the particular complexity of the particular sub-operation in the operation workflow. For example, a data stream may require two sub-operations, one of which is high complexity and one which is low complexity. Accordingly, controller 125 can initially route the data stream to a general purpose processor 120 to perform the high complexity sub-operation. The output of the general purpose processor 120 (i.e., a partially processed data stream), can then be routed to a specific purpose processor 115 to perform the subsequent low complexity sub-operation.

In some cases, controller 125 can also perform (e.g., real-time, or near real-time), load balancing between processors based on the complexity of data processing operations being performed by the processors.

For instance, in some example cases, controller 125 can determine that a general purpose processor 120 is performing low complexity processing tasks, or a combination of high and low complexity processing tasks. Controller 125 can also determine that the general purpose processor 120 is operating at, or near, maximum processing capacity, or otherwise, is expected to operate at, or near, processing capacity. Accordingly, to reduce the processing load on the general purpose processor 120, controller 125 can route, or re-route, data streams, requiring low complexity operations, from the general purpose processor 120 to one or more specific purpose processors 115 which are configured to perform the low complexity processing tasks. In this manner, the general purpose processors 120 is provided with greater processing availability to perform the high complexity processing operations.

Similarly, controller 125 can determine that a specific purpose processor 115 is performing high complexity processing tasks, or a combination of high and low complexity processing tasks. Accordingly, controller 125 can instruct one or more general purpose processors 120 to perform the high complexity operations. Controller 125 can then route data streams, requiring the high complexity processing operations, from the specific purpose processor 115 to the designated general purpose processors 120. In this manner, the specific purpose processors 115 are provided with greater processing availability to perform the low complexity processing operations.

(iv) Designating Processors based on Data Streams' Processing Priorities

Controller 125 can also designate processors to receive data streams based on the data streams' processing priorities. The processing priority of a data stream can refer, for example, to the immediacy (e.g., a time-based urgency) for processing a data stream in order to route the processed data stream to a downstream device.

In some embodiments, controller 125 can determine the processing priority of a data stream based on information received from data source 105. For instance, data source 105 can directly transmit information indicating that certain data streams require immediate processing (e.g., high priority data streams) or non-immediate processing (e.g., low priority data streams).

In other cases, controller 125 can determine the processing priority of a data stream based on the type of the data source 105 that transmits the data stream, or the type of the content contained in the data streams. For example, media streams from a television production facility for generating live television content can require immediate processing, while media streams from a television production facility for generating pre-recorded television programs may not require immediate processing.

In still other cases, controller 125 can determine the processing priority of data streams based on the destination of the data streams. For example, controller 125 can determine that data streams directed to specific destinations may require immediate or non-immediate processing.

In various cases, controller 125 can designate one or more processors with high processing availability to receive high priority media streams. These processors can be high availability specific purpose processors 115 that are configured to perform the required data processing operations, or otherwise, high availability general purpose processors 120. Controller 125 can also designate one or more low availability processors to receive low priority data streams.

In other embodiments, controller 105 can only designate high availability specific purpose processor 115 to receive and process high priory data streams, assuming the specific purpose processors 115 are configured to perform the required processing operations. In particular, in contrast to general purpose processors 120, specific purpose processors 115 can more efficiently process high priority data streams due to their specialized nature. Controller 105 can accordingly designate general purpose processors 120 to receive and process low priority data streams.

As explained previously, in various cases, to accommodate high or low priority data streams, controller 125 can also control an SDN data plane of network 110. For example, controller 125 can control the data plane to route high priority data stream through low traffic network paths, and low priority data streams through high traffic network paths. In cases where the SDN controller is separate from controller 125, controller 125 can inform the SDN controller regarding the priority of a data stream. The SDN controller can then re-optimize network traffic to accommodate different priorities of different data streams.

(v) Designating Processors Based on the Frequency of Required Processing Operations In various cases, controller 125 can also designate processors to receive data streams based on the frequency of operations to be performed on the data streams.

In particular, owing to their specialized nature, specific purpose processor 115 may be better suited for performing defined tasks with high recurrence. Controller 125 can accordingly route data stream requiring high frequency processing to configured specific purpose processors 115. In other cases, controller 125 can also instruct general purpose processors 120 to perform processing tasks which are low in frequency.

In at least some embodiments, the frequency of a data processing operation can be determined by monitoring (i.e., via controller 125) the number of past re-occurrences of the same data processing task within, for example, a pre-determined lapsed period. In other cases, controller 125 may simply identify (or receive information, i.e., from data source 105) that particular data processing operations are high in frequency. In still other cases, the frequency of a data processing operation can be based on scheduled times the data streams are received (e.g., particular processing operations may occur at higher frequencies at specific scheduled times).

In view of the foregoing, it will be appreciated that controller 125 can designate processors to receive data streams based on any combination of factors, including one or more of the processing availability of each processor, as well as the type of processing operations required to be performed on the data stream, the complexity of the data processing operations, the processing priority of each data stream and the frequency of the data processing operation.

Figure 4A:
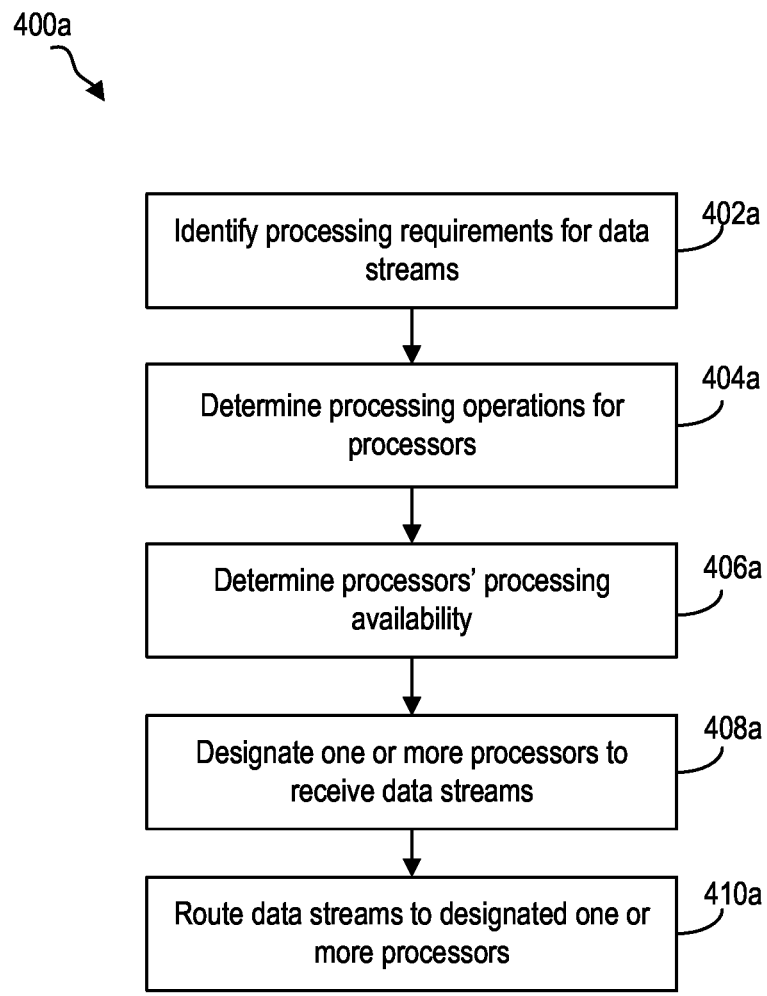
FIG. 4A is an example process flow for an example method for designating processors, according to some embodiments.

Referring now to FIG. 4A, there is shown an example process flow for a method 400a for designating processors to receive data streams, according to some embodiments. Method 400a can be performed, for example, by controller 125 of system 100.

At 402a, controller 125 can identify the processing requirements of one or more data streams. By way of non-limiting examples, this can include identifying the types of processing operations required to be performed on the data streams, the complexity of the processing operations, the data streams' processing priority and the frequency of the required data processing operation.

At 404a, controller 125 can determine the types of processing operations being performed by each specific purpose processor 115 and/or general purpose processor 120 in system 100.

For example, controller 125 can query each specific purpose processor 115 in respect of its data processing configuration, or otherwise, each specific purpose processor 115 can automatically transmit data processing configuration information to controller 125. Similarly, controller 125 can also query or automatically receive processing information from each general purpose processors 120 in respect of their current processing operations.

At 406a, controller 125 can determine the processing availability of various processors in system 100.

For example, controller 125 can determine current or expected processing load of each processor 115, 120 in system 100. For instance, and as explained previously, controller 125 can determine the current processing load of each processor based on load information received from different processors, or otherwise, the number of data streams previously routed by controller 125 to the processor. Controller 125 can also determine future processing load based on expected incoming data streams that are normally routed by controller 125 to the one or more processors.

In some cases, at 406a, controller 125 may only determine the processing availability of processors which are determined, at 406a, to have a data processing configuration (i.e., in the case of specific purpose processors 115), or data processing functionality (i.e., in the case of general purpose processors 120), which corresponds to the type of processing operations required to be performed on the data stream, as identified at 402a.

At 408a, based on the processing requirements of the data streams, the processing operations performed by each processor 115, 120, and the processing availability of each processor, controller 125 can designate one or more processors 115, 120 to receive and process the data streams as explained previously herein.

For example, controller 125 can designate a specific purpose processor 115 to receive a high priority stream, or a stream requiring a low complexity or high-frequency processing operation. Further, controller 125 can designate general purpose processors 120 to receive low priority streams, or streams requiring a high complexity or high-frequency processing operations.

In some cases, to mitigate conflicts, controller 125 may store (e.g., in an accessible memory storage, such as an embedded memory) a prioritization list of factors for designating processors. For example, the processing priority of a data stream may be allocated greater weight than the complexity of the required data processing operation. Accordingly, a higher priority data stream may be designated to a specific purpose processor 115, despite the fact that the stream requires a high complexity operation which is ordinarily performed by a general purpose processor 120. In various cases, controller 125 can initially evaluate all processing requirements of a data stream, and may determine whether to designate a data stream to a specific or general purpose processor by cross-referencing the processing requirements to the pre-determined factor prioritization. In other cases, controller 125 may only evaluate processing requirements in the order of prioritization, instead of initially considering all requirements. In still other cases, controller 125 may store a pre-defined weighting scheme which allocates different bias weights to different factors (i.e., processing requirements) and further accounts for the degree of priority, degree of processing complexity, etc. (i.e., the priority and processing complexity can be expressed as a number of between 1-10, etc. to express different degrees of priority or complexity). and the output of the bias weighted calculation is used to determine if a specific purpose processor 115 or a general purpose processor 120 is better suited. For example, if the bias weight is below or above a pre-determined threshold, the data stream may be designated to a specific purpose processor 115 or general purpose processor 120.

In other embodiments, controller 125 may also prioritize designating certain types of processors over others. For example, controller 125 may initially attempt to designate an available specific purpose processor 115 to process a data stream. In particular, this may be because specific purpose processors 115 are generally able to execute processing operations more efficiently. However, in response to certain conditions, the controller 125 may instead designate a general purpose processor 120 to receive the data stream. For example, the conditions for designating a general purpose processor 120 can include determining that no specific purpose processors 115 are available, or otherwise that the data stream is low priority, requires high complexity and/or low frequency operations. In various cases, the conditions may also be expressed according to a pre-determined prioritization list (i.e., certain conditions may be more significant than others).

At 410a, based on the designations, controller 125 can route the data streams to the designated processors. For example, controller 125 can act as an SDN controller and control an SDN data plane to route the data streams to the designated processors. Controller 125 can also instruct an independent SDN controller to route the data streams to the designated processors.

III. Configuring and/or Re-Configuring Specific Purpose Processors

Referring now back to FIG. 1, as stated previously, specific purpose processors 115 in system 100 can be configured, or re-configured (in whole or in-part) to perform new or different data processing operations. For example, each specific purpose processor 115 can have a hardware configuration (e.g., circuit configuration) which is configurable, or re-configurable, in whole or in-part to allow the specific purpose processor 115 to perform new data processing tasks, additional data processing tasks, different data processing tasks and/or substitute old data processing tasks for new data processing tasks. As well, the specific purpose processor 115 may be re-configurable to provide an updated version of an existing processing task. In various cases, the specific purpose processor can be configured, or re-configured, in real-time or near real-time, while the system remains operational.

In some example cases, an "inactive" specific purpose processors 115, (i.e., a specific purposes processor 115 that is not otherwise processing data streams), can be "configured" to perform new data processing tasks. In other words, the "inactive" specific purpose processors 115 can be "activated" (e.g., brought "on-line") dynamically, and in real-time while the system 100 is operational to process data streams. In at least some embodiments, an "inactive" specific purpose processors 115 can be "activated" for processing operations for which additional specific purpose processors 115 may improve overall system processing availability, throughput, and/or efficiency. Additionally, "inactive" specific purpose processors 115 may be "activated" to accommodate existing network traffic. In other cases, the additional specific purpose processors 115 may be activated to provide redundant network traffic paths.

Similarly, an "active" specific purpose processors 115 (i.e., a processor which is already processing data streams) can be "re-configured", in whole or in-part, to either, (i) perform additional (or new) data processing tasks (e.g., if the processor has high processing availability); (ii) substitute some or all old data processing tasks for new data processing tasks (e.g., if the old processing tasks performed by the processor are not required, or are otherwise being performed by other specific or general purpose processors), or (iii) otherwise, "de-activated" (e.g., brought "off-line") (e.g., where the operations performed by the active specific purpose processor 115 are no longer required, or are redundant to the operations of other processors). In some example cases, "active" specific purpose processor 115 can be "re-configured" to perform new or different processing tasks where there is an overcapacity in processing availability for the particular processing operations being performed by the processor, or where other processing operations have a greater need for processing availability than processing operations currently being performed by the specific purpose processor 115. Accordingly, in some cases, "active" specific purpose processors can be re-configured, in whole or in-part, to support processing operations that require additional processing availability.

In various embodiments, specific purpose processors can be "configured" and/or "re-configured" (or otherwise de-activated) in response to receiving "configuration instructions".

For example, in some embodiments, the central controller 125 can generate and transmit configuration instructions to one or more specific purpose processors 115. The configuration instructions can instruct the specific purpose processors 115 to implement new or updated hardware configurations that performs new or substituted data processing tasks.

In other example embodiments, a general purpose processors 120 can also generate configuration instructions either, alone or in response to a command, e.g., by controller 125 or an external input.

For example, in some embodiments, controller 125 can transmit instructions to a general purpose processor 120 to generate configuration instructions for one more specific purpose processors 115. General purpose processor 120 can then generate the configuration instructions by executing, for example, a software program dedicated to generating configuration instructions for FPGA processors. General purpose processor 120 can then transmit, in real-time or near real-time, the configuration instructions to controller 125, or otherwise, to one or more designated specific purpose processors 120.

Alternatively or in addition, general purpose processors 120 can receive input data from an external source (e.g., input data from a user interface coupled to the general purpose processor 120). The input data can instruct the general purpose processors 120 to generate specific configuration instructions. The general purpose processor 120 can generate and transmit the configuration instructions to specific purpose processors 115 as designated by the external source, or by controller 125.

In some embodiments, the general purpose processors 120 can also automatically generate configuration instructions. For example, general purpose processors 120 can automatically generate and transmit pre-determined configuration instructions at specific time intervals, or in response to receiving specific data streams.

In some cases, the configuration instructions, generated by the general purpose processors 120, can be stored in a memory of the general purpose processor 120. Controller 125 can then retrieve the configuration instructions from the general purpose processor's memory at a subsequent time, and can transmit the configuration instructions to designated specific purpose processors 115. Controller 125 can also instruct the general purpose processor 125 to directly transmit the configuration instructions at a subsequent time to designated specific purpose processors 115. In some cases, the general purpose processors 120 can also automatically transmit the stored configuration instructions to one or more designated specific purpose processors 115.

In at least some embodiments, configuration instructions generated by the general purpose processor 120, can be in respect of one or more data processing operations currently being performed by the general purpose processor 120. For example, data processing operations being performed by a general purpose processor 125 may be transferred to (or replicated at) one or more specific purpose processor 115 for execution.

In various cases, the configuration instructions generated by either the central controller 125 and/or a general purpose processor 120 can be dynamically generated while the system is operational.

In still other embodiments configuration instructions can be stored inside an embedded memory of the specific purpose processors 115. The specific purpose processor 115 may automatically implement the configuration instructions at pre-defined time intervals, or in response to pre-defined events (e.g., receiving a specific type of data stream requiring a specific known type of processing operation). In other cases, the specific purpose processor 115 may implement the stored configuration instructions in response to a prompt command received from the central controller 125, a general purpose processor 120 or an external input.

In at least some embodiments, the configuration instructions can also be stored in data storage 130. For example, data storage 130 can store configuration instructions previously generated by central controller 125, general purpose processor 120, or other external sources. Central controller 125 can then retrieve the configuration instructions from data storage 130 at an appropriate time, and can transmit the configuration instructions to designated specific purpose processors 115.

Irrespective of how the configuration instructions are generated, there are a number of considerations which can determine whether or not special purpose processors 115 require configuring or re-configuring, including by way of non-limiting examples, (i) processing operations required to be performed on incoming data streams; (i) balancing the processing load in the system; (iii) complexity of processing operations required for data streams; (iv) processing priority of data streams; and/or (v) frequency of required processing operations.

(i) Processing Requirements of Incoming Data Streams

In at least some embodiments, specific purpose processors 115 can be configured or re-configured based on the types of processing operations required to be performed on incoming data streams.

For instance, in some example cases, controller 125 can determine a processing operation required to be performed on a data stream. Controller 125 can also determine that no specific purpose processors 115 and/or general purpose processors 120 are currently configured, or are available, to perform the necessary data processing operations. In other cases, controller 125 may only consider and determine the availability and/or configurability of specific purpose processors 115 in the system without regarding the general purpose processors 120. Accordingly, controller 125 can configure, or re-configure (in whole or in-part), one or more specific purpose processors 115 to perform all, or some, of the required data processing operations. Controller 125 can then route the data streams to the configured specific purpose processors 115.

Figure 4B:
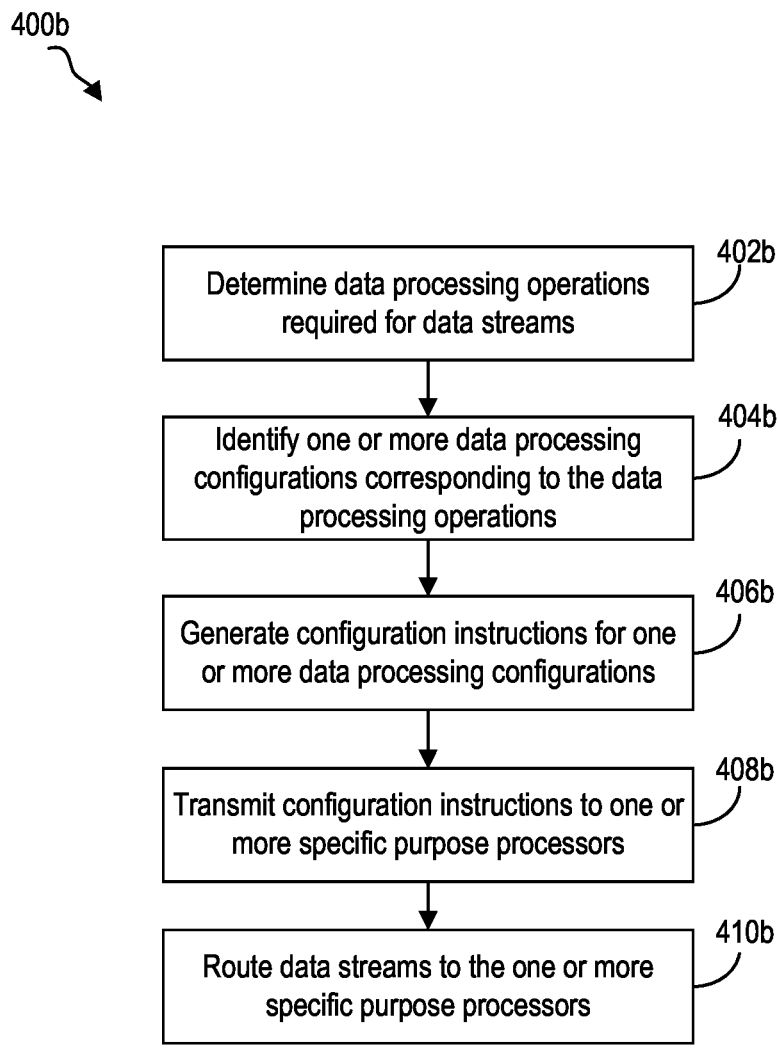
FIG. 4B is an example process flow for an example method for configuring one or more specific purpose processors to perform data processing operations, according to some embodiments.

Referring now briefly to FIG. 4B, there is shown an example process flow for an example method 400b for configuring one or more specific purpose processors 115 to perform data processing operations, according to some embodiments. The method 400b can be performed, for example, using controller 125 of system 100.

At 402b, controller 125 can determine the data processing operations required to be performed on one or more data streams in network 110. The data processing operations can be determined in a manner as previously described herein. In various cases, the data processing operations can include a workflow that includes a plurality of sub-data processing operations.

At 404b, controller 125 can identify (or determine) one or more data processing configurations which correspond to the one or more identified data processing operations.

For example, determining a data processing configuration for a specific purpose processor 115 can include determining the particular programmed state of various programmable logic block elements in the specific purpose processor 115 that would allow the specific purpose processor 115 to perform the desired data processing operations. In other cases, identifying a data processing configuration for a specific purpose processor 115 may not be so granular, and may merely comprise identifying a general mode of operation for the specific purpose processors 115. For example, determining a data processing configuration may simply involve identifying that a specific purpose processor 115 should complete a specific data processing task, or that the specific purpose processor 115 should be configured to operate in a mode which accepts specific inputs, and in turn, generates specific outputs, which correspond to the desired data processing operations.

In some embodiments, a data processing configuration is identified for each required data processing operation. For example, this may be necessary where each data processing operation is to be performed by a different specific purpose processor 115, or a different hardware portion of a single specific purpose processor 115. In other cases, a single data processing configuration can be identified for a group (i.e., multiple) data processing operations. For example, a data processing configuration can correspond to a workflow (i.e., multiple) data processing operations performable by a single specific purpose processor 115.

At 406b, controller 125 can generate configuration instructions to implement each data processing configurations identified at 402b. In other words, for each data processing configuration identified at 404b, corresponding configuration instructions may be generated.

In particular, the configuration instructions instruct specific purpose processors 115 as to how to vary their hardware configuration (i.e., in whole or in-part) (e.g., varying their programmable logic components) in order to perform the necessary one or more desired corresponding data procession operations. In other words, when the configuration instructions are executed by specific purpose processors 115, the specific purpose processors 115 are able to adopt the data processing configuration associated with the configuration instructions in order to perform the desired data processing operations.

Configuration instructions can take one of a number of forms. In some embodiments, configuration instructions can include a stream (e.g., binary stream) of configuration data that instruct, a specific purpose processor 115, at a generally granular level, as to how to vary each of its programmable logic components to implement the desired data processing configuration. For example, the data stream can include binary data that instruct the specific purpose processor 115 as to how to vary each of its switches in each of its programmable logic blocks (i.e., vary a switch to a high or low state).

In other embodiments, the configuration instructions may not necessarily take such a precise form, but can also simply comprise a general command for the specific purpose processor 115 to adopt the particular mode of operation associated with a data processing configuration. For example, the controller 125 can transmit instructions to the specific purpose processor 115 to adopt a particular mode of operation that accepts specific inputs and generates specific outputs. Further, a memory coupled to the specific purpose processor 115 may pre-store configuration data (i.e., binary data) for different modes of operation. For example, this can comprise a processor-specific memory, or otherwise, memory associated with data storage 130. Accordingly, in response to receive the configuration instructions, the specific purpose processor 115 may "look-up" and retrieve the corresponding configuration data for the identified mode, and may self-implement the configuration data to vary its hardware configuration accordingly.

At 408b, controller 125 can transmit the configuration instructions to one or more specific purpose processors 115. In response, the specific purpose processor 115 can execute the configuration instructions to implement the required respective hardware configurations. In some cases, controller 125 can transmit multiple configuration instructions to the same single specific purpose processor 115. For example, different sets of configuration instructions can be used to vary different hardware portions of the same specific purpose processor 115.

In various cases, at 408b, controller 125 can transmit the configuration instructions to specific purpose processors 115 that are determined to have high processing availability. That is, controller 125 may initially determine availability of specific purpose processors 115 prior to transmitting configuration instructions to those processors. In other cases, controller 125 can transmit the configuration instructions to specific purpose processors 115 that are performing operations that are no longer required by the system, or are otherwise performing operations that are being performed by other system processors (e.g., redundant operations). In this case, the configuration instructions may "re-configure" the specific purpose processor 115 (e.g., in whole, or in-part) to substitute old operations, for new processing operations.

At 410b, controller 125 can route, or re-route, the data streams to the one or more designated specific purpose processors which are configured at 408b.

In some embodiments, prior to performing act 406b, the controller 125 may initially determine whether any specific purpose processors 115 are already configured for the data processing configurations identified at 404b, and in some cases, may also determine whether these processors have processing availability. Controller 125 may then simply route (or re-route) the data streams to these processors without generating new configuration instructions.

Figure 4C:
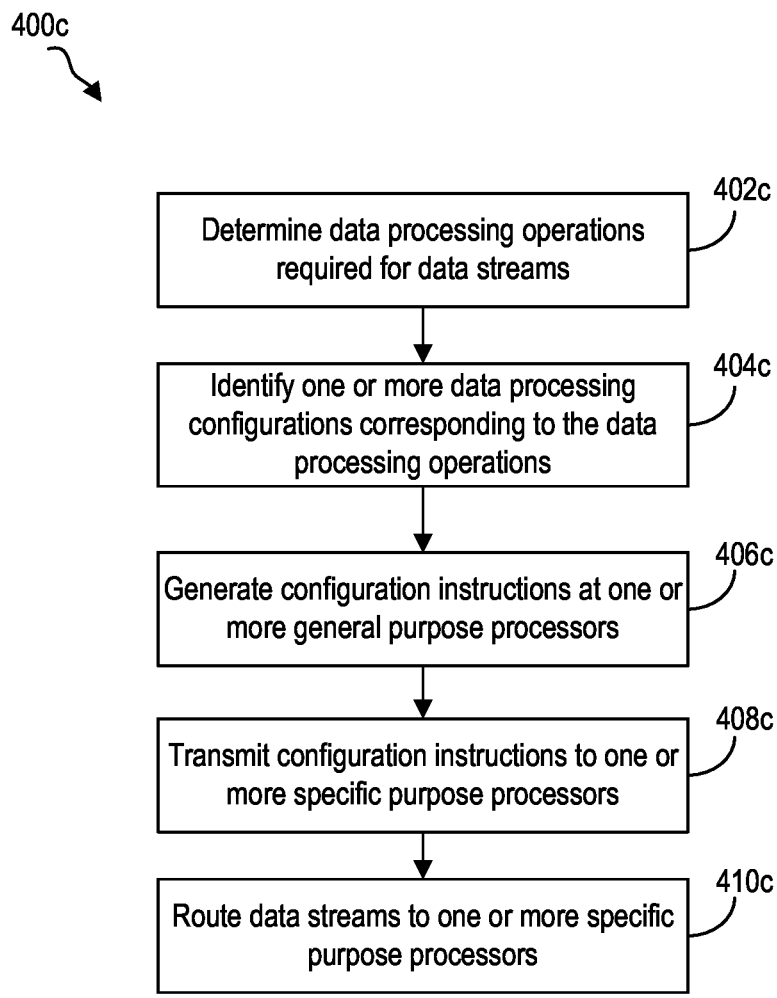
FIG. 4C is an example process flow for an example method for configuring one or more specific purpose processors to perform new data processing operations, according to some other embodiments.

Referring now briefly to FIG. 4C, there is shown an example process flow for an example method 400c for configuring one or more specific purpose processors 115 to perform data processing operations, according to still some other embodiments. The method 400c can be performed, for example, using a combination of controller 125 and one or more general purpose processors 120 of system 100.

In particular, method 400c is generally similar to method 400b of FIG. 4B, except at 406c, controller 125 can transmit instructions to one or more general purpose processors 120 to generate the required configuration instructions. In response, the general purpose processor 120 can execute a software program which is configured to generate configuration instructions. For example, in some example cases, controller 125 can identify a desired data processing configuration for one or more specific purpose processors 115. Controller 125 may then transmit a command to one or more general purpose processors 120 to generate configuration instructions corresponding to the desired data processing configuration. For example, the command may include the desired data processing configuration, and in response, the general purpose processor 120 may generate the corresponding configuration instructions. In other cases, controller 125 may not necessarily identify the desired data processing configuration, but may simply transmit a command which includes the desired data processing operations for one or more specific purpose processor 115. In response, the general purpose processor 120 may, itself, determine the relevant data processing configuration and, in turn, generate the relevant configuration instructions.

In some cases, controller 125 may only transmit a command to a general purpose processor 120 to generate configuration instructions after determining that the general purpose processor 120 is able to execute a software program which is capable of generating configuration instructions. For example, in some cases, only some of the general purpose processors 120 in system 100 may be capable of generating configuration instructions. Accordingly, controller 125 may either query the general purpose processors 120 in system 100 for their software capabilities, or otherwise, may maintain a database (i.e., record) of each general purpose processors' software capabilities. In response to determining that a general purpose processor 120 is capable of generating configuration instructions, controller 125 may command that general purpose processor 120 to generate the relevant configuration instructions. In some cases, controller 125 may also first determine that a general purpose processor 120 has processing availability before commanding the general purpose processor 120 to generate configuration instructions.

In still other embodiments, different general purpose processors 120 may be configured to generate different types of configuration instructions. For example, some configuration instructions may require different software programs for generating the instructions. For instance, configuration instructions for different data processing operations may require different software programs. Otherwise, different configuration instructions may be required based on the type of specific purpose processor 115 implementing the instructions (e.g., different specific purpose processors 115 may have different hardware, and may accordingly respond to different configuration instructions). Accordingly, at 406c, controller 125 may only command a general purpose processor 120 to generate configuration instructions once the controller 125 determines that the general purpose processor 120 is executing a software program that is capable of generating the relevant type of configuration instructions. To this end, it will be appreciated that where the controller 125, itself, is generating the configuration instructions (e.g., method 400b), controller 125 may also account for the type of data processing operation, and the particular hardware of a specific purpose processor 115, to determine the correct "type" of configuration instructions to generate. For example, in some example cases, controller 125 can query specific purpose processors 115 for their hardware type, or otherwise maintain a record of each processors' hardware type, in order to generate the correct type of configuration instructions for that processor.

In still yet some cases, controller 125 may command multiple general purpose processors 120 to generate configuration instructions. For example, where a workflow of data processing operations requires multiple configuration instructions to be generated, different general purpose processors 120 may be commanded to generate different configuration instructions.

At 408c, the configuration instructions can be received by controller 125 from the general purpose processors 120, and transmitted to one or more specific purpose processors 115. In other cases, the configuration instructions can be transmitted directly from the general purpose processors 120, via network 110, to the one or more designated specific purpose processors 115.

Figure 4D:
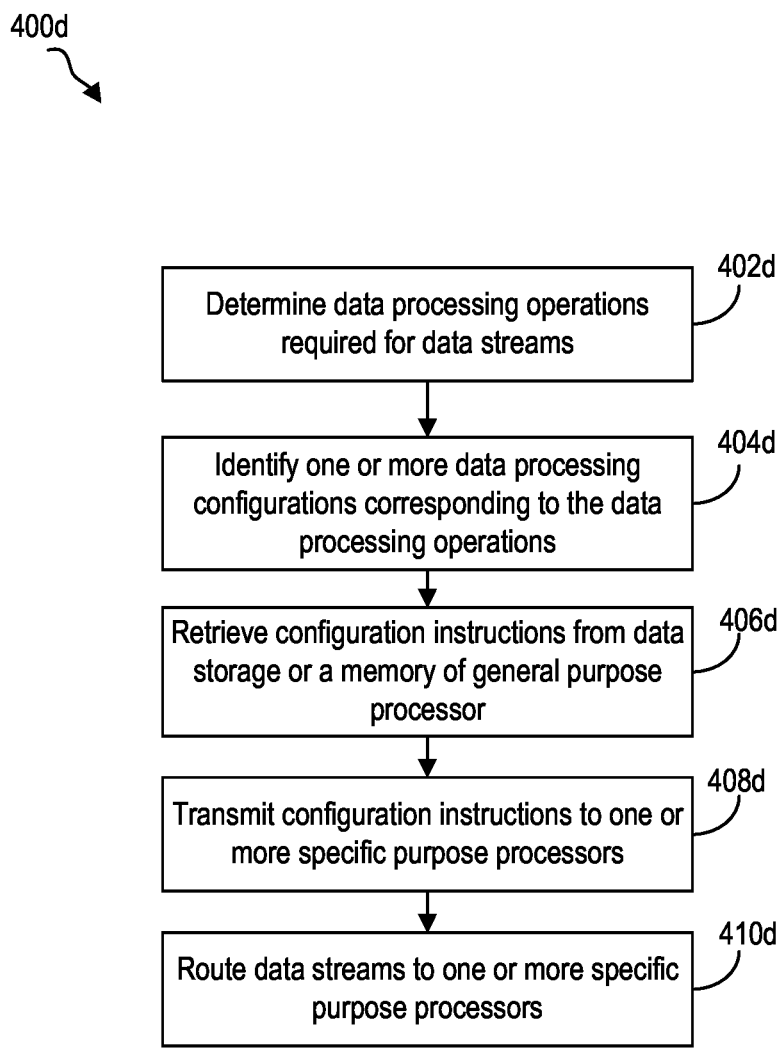
FIG. 4D is an example process flow for an example method for configuring one or more specific purpose processors to perform data processing operations, according to still some other embodiments.

Referring now briefly to FIG. 4D, there is shown an example process flow for an example method 400d for configuring one or more specific purpose processors to perform data processing operations, according to still some other embodiments. The method 400d can be performed, for example, using a combination of controller 125 and one or more general purpose processor 125 of system 100.

Method 400d is similar to method 400b of FIG. 4B, however, at 406d, the controller 125 can retrieve configuration instructions stored in data storage 130, in a memory of one or more general purpose processors 120. For example, configuration instructions for certain pre-defined configurations may be pre-generated, and pre-stored in the data storage 130 and/or an embedded memory of a general purpose processor 120.

At 408d, the retrieved configuration instructions can be transmitted by controller 125 to one or more specific purpose processors 115. In other cases, the configuration instructions can also be transmitted directly from the data storage 130 or general purpose processors 120, via network 110, to the one or more designated specific purpose processors 115.

(ii) Balancing Processing Load

In at least one some embodiments, the processing operation of the specific purpose processors 115 in system 100 can also be modified (e.g., configured or re-configured) to balance the processing load in system 100 (i.e., in real-time or near real-time).

For example, in various cases, controller 125 can determine that one or more general purpose processors 120 is carrying a high processing load, or is expected to carry a high processing load. Accordingly, to reduce the current or future processing load on a general purpose processor 120, the controller 125 can configure one or more specific purpose processors 120 (i.e., in whole, or in-part) to implement all, or some, of the data processing operations being performed by the general purpose processor 120. The controller 125 can then re-route all, or some, of the data streams directed to the general purpose processor 120 to the configured specific purpose processors 115. In this manner, controller 125 can reduce the processing load on the general purpose processors 120.

In other example cases, controller 125 can determine that one or more specific purpose processors 115 is carrying a high processing load, or is expected to carry a high processing load. Accordingly, controller 125 can similarly configure or re-configure (i.e., in whole or in-part) one or more additional specific purpose processors 115 to perform processing operations performed by the overcapacity specific purpose processors 115. Controller 125 can then route, or re-route, data streams from the overcapacity specific purpose processors 115 to the new configured (or re-configured) specific purpose processors 115. In this manner, controller 125 can reduce the processing load on the overcapacity specific purpose processors 115.

Figure 4E:
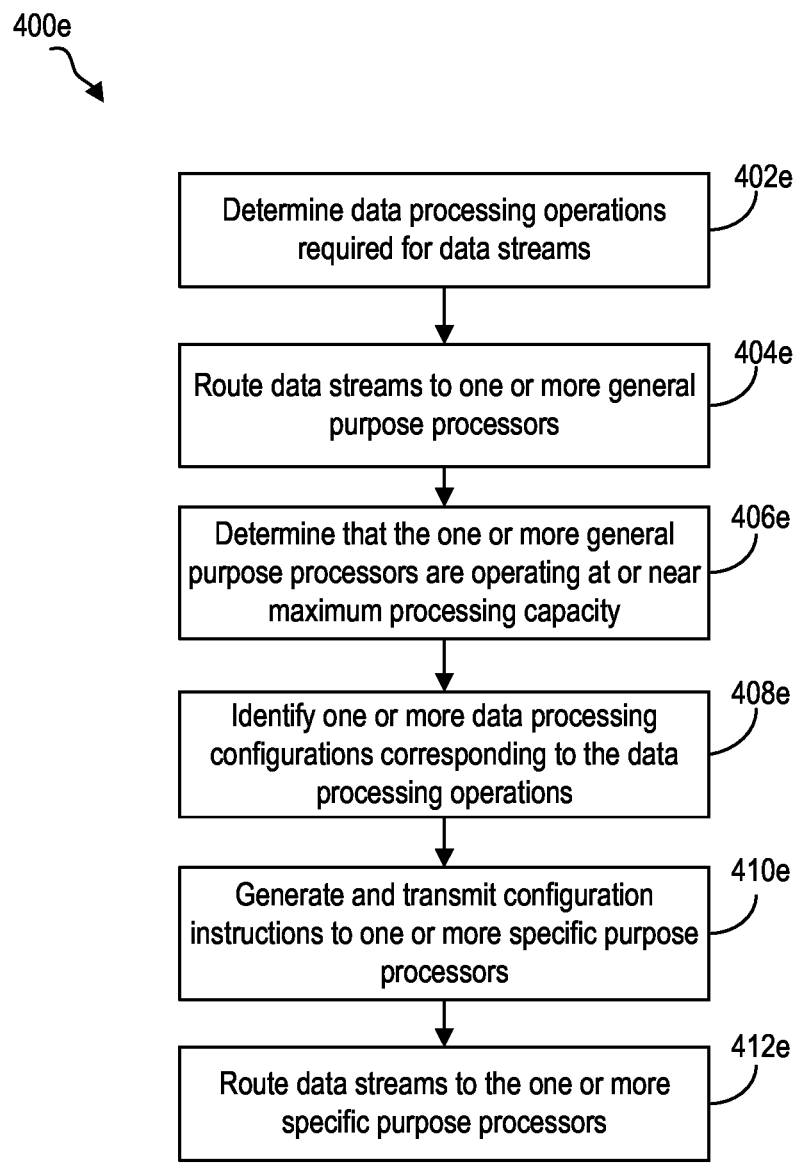
FIG. 4E is an example process flow for an example method for configuring one or more specific purpose processors to perform data processing operations, according to still yet some other embodiments.

Referring now to FIG. 4E, there is shown an example process flow for an example method 400e for configuring one or more specific purpose processors to perform data processing operations in order to balance processing load, according to some embodiments. The method 400e can be performed, for example, using controller 125 of system 100.

At 402e, controller 125 can determine one or more data processing operations required to be performed on one or more data streams. The data processing operations required to be performed on a data stream can be determined in a manner as previously explained herein.

At 404e, controller 125 can route the one or more data streams to one or more general purpose processors which perform the required data processing operations.

At 406e, controller 125 can determine that the general purpose processors 120, receiving data streams at 404e, are operating at or near their maximum processing capacity, or are expected to reach their maximum processing capacity at future point in time.

At 408e, controller 125 can identify one or more data processing configurations corresponding to the one or more data processing operations.

At 410e, configuration instructions can be generated and transmitted to one or more designated specific purpose processors 115. For example, the one or more designated specific purpose processors 115 can be processors that are determined to have high processing availability, or otherwise, are currently performing operations that are no longer required or are already being performed by other processors. The configuration instructions generated, at 410e, can be generated by either the controller 125, or otherwise, a general purpose processor 120. In other cases, the configuration instructions can also be retrieved from data storage 130, or a memory of a general purpose processor 120.

At 412e, the data streams can be re-routed from the general purpose processors 120 to the one or more designated and configured specific purpose processors 115.

In other embodiments, prior to performing act 410e, the controller 125 may first determine whether any specific purpose processors 115 are already configured to perform the data processing configuration identified at 408e, and in some cases, may also determine whether these processors have processing availability. Controller 125 may then simply route (or re-route) the data streams to these processors without generating new configuration instructions.

(iii) Complexity of Processing Operations Required for Data Streams

In some other embodiments, specific purpose processors 115 can be configured, or re-configured, based on the complexity of the processing operations required to be performed on data streams.

For instance, in some example cases, controller 125 can determine that a data stream requires one or more low complexity data processing operations. Controller 125 can also determine that no specific purpose processors 115 are currently designated, or are available, to perform the necessary data processing operations. Accordingly, controller 125 can configure one or more specific purpose processors 115 to perform the low complexity operations. Controller 125 can then route data streams to the configured specific purpose processors 115.

In other cases, controller 125 can determine that a general purpose processor 120 is processing low complexity tasks, or a combination of high and low complexity tasks. Controller 125 can also determine that the general purpose processors 120 is operating at, or near, maximum processing capacity—or otherwise—is expected to operate at, or near, processing capacity. Accordingly, to reduce the processing load on the general purpose processor 120, controller 125 can configure one or more specific purpose processors 115 to perform the low complexity operations, assuming no specific purpose processors 115 are already configured to perform the required tasks and are otherwise available. Controller 125 can then re-route data streams from the general purpose processors 120 to the configured specific purpose processors 115. In this manner, the general purpose processors 120 can have greater processing availability to perform the high complexity processing operations. In some cases, a data stream may require a workflow of high and low complexity operations. Accordingly, in these cases, the data streams can be re-routed from the general purpose processors 120 to the configured (or re-configured) specific purpose processors 115 for the low complexity operations, and re-routed back to the general purpose processors 120 for the high-complexity operations, and vice-versa.

Figure 4F:
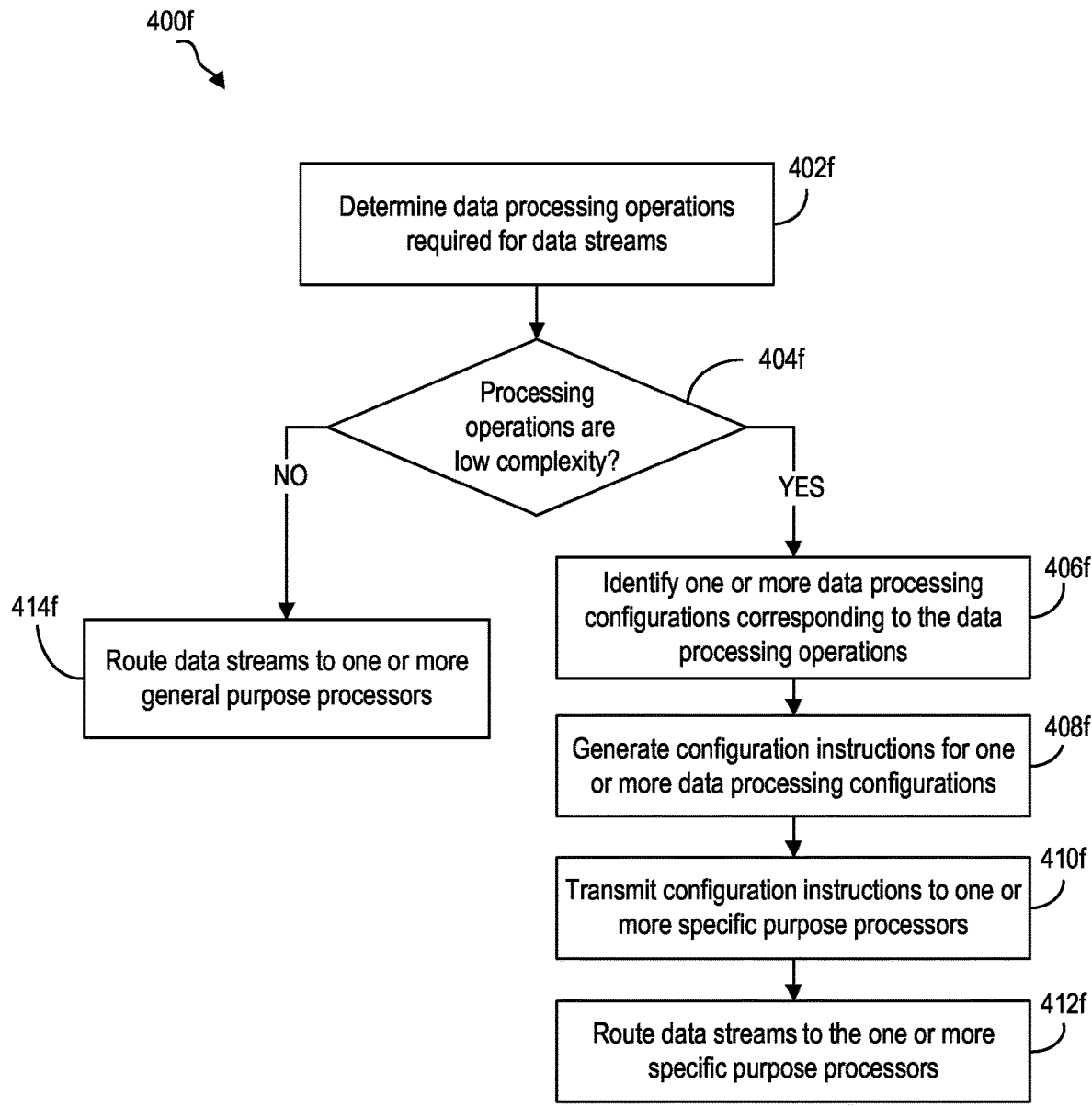
FIG. 4F is an example process flow for an example method for configuring one or more specific purpose processors to perform data processing operations, according to some other embodiments.

Referring now briefly to FIG. 4F, there is shown an example process flow for an example method 400f for configuring one or more specific purpose processors to perform data processing operations based on the complexity of data streams, according to some other embodiments. The method 400f can be performed, for example, using controller 125 of system 100.

In particular, method 400f is generally analogous to method 400b of FIG. 4B, except that, at 404f, controller 125 can determine the complexity of one or more data processing operations, required to be performed on one or more received data streams. The data streams which are analyzed for their complexity may be new incoming data streams, or data streams being currently processed by one or more processors (e.g., overcapacity general purpose processors 125). More particular, at 404f, it is determined whether the complexity of the required data processing operations is a low complexity operation. In some cases, as stated previously, the complexity of the processing operation is determined based on the type of processing operation. For example, controller 125 may have access to a memory storing pre-defined complexity levels corresponding to different types of operations. In other cases, the complexity can be determined based on the size of the data stream (e.g., a larger data stream may be more complex to process). If the data processing operation is low complexity, at 406f, a data processing configuration corresponding to the data processing operations can then be identified. Acts 406f-412f are then generally analogous to acts 404b-410b of method 400b. Otherwise, if it is determined at 404f that the complexity of the data processing operations is a high complexity operation, at 414f, the data streams can be routed to a general purpose processor 120. In at least some cases, the data streams may be routed at 414f to one or more general purpose processors 120 that have availability and/or are determined to be executing one or more software programs that can perform the required data processing operations on the data streams. In other cases, instructions can be sent (i.e., by controller 125) to a general purpose processor 120 to execute a software program configurable to perform the necessary data processing operations.

It will be appreciated that, in some cases, more than one data processing operation may be required to be performed on a data stream. Accordingly, in these cases, the method 400f can be iterated for each one or more separate data processing operations.

(iv) Processing Priority of Data Streams

In still other embodiments, specific purpose processors 115 in system 100 can be configured (or re-configured) based on the processing priority of data streams.

For instance, in some example cases, controller 125 can determine that one or more data streams are high priority data streams, and accordingly, require immediate processing. Controller 125 can also determine that there are no specific purpose processors 115 that are designated, or available, to perform the required high priority processing operations. Accordingly, controller 125 can configure or re-configure (i.e., in whole, or in-part) one or more specific purpose processors 115 to perform the required high priority processing operations. As stated previously, specific purpose processors 115 can be suited to performing urgent processing tasks due their more specialized nature. In other cases, controller 125 can also instruct general purpose processors 120 to perform any low priority processing tasks.

In some embodiments, controller 125 can perform load balancing by determining that a general purpose processor 120 is processing high priority data streams, or a combination of high and low priority data streams. Controller 125 can also determine that the general purpose processors 120 is operating at, or near, maximum processing capacity—or otherwise—is expected to operate at, or near, processing capacity. Accordingly, controller 125 can configure (or re-configure) one or more specific purpose processors 115 to perform the high priority data processing operations. Controller 125 can then re-route the high priority data streams from the general purpose processors 120 to the configured specific purpose processors 115.

Figure 4G:
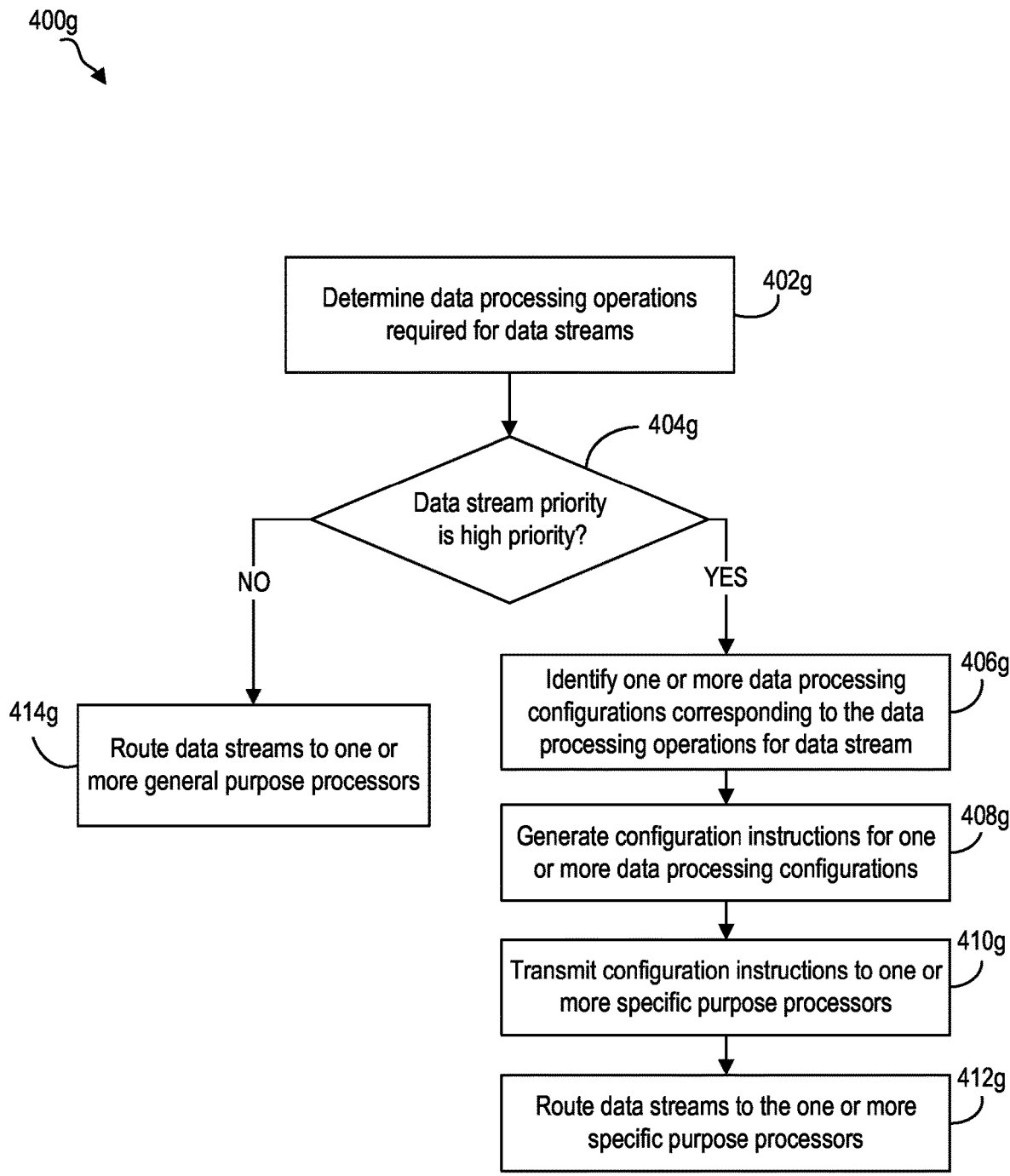
FIG. 4G is an example process flow for an example method for configuring one or more specific purpose processors to perform data processing operations, according to some embodiments.

Referring now briefly to FIG. 4G, there is shown an example process flow for an example method 400g for configuring one or more specific purpose processors to perform data processing operations based on the priority of the data streams, according to some other embodiments. The method 400g can be performed, for example, using controller 125 of system 100.

Method 400g is generally analogous to method 400f of FIG. 4F, except that at 404g, controller 125 can determine the processing priority of a data stream. In particular, the priority of a data stream can be determined in a manner as previously described herein. The priority of a data stream can be determined for new incoming data streams, or otherwise, at 402g, controller 125 can specifically identify the priority of data streams being processed by a general purpose processor 120 that is operating at, or near, maximum processing capacity—or otherwise—is expected to operate at, or near, processing capacity. In particular, at 404g, it is determined whether the data stream priority is a high priority stream. If so, at 406g, one or more data processing configurations can then be identified corresponding to one or more data processing operations required to be applied to the high priority data stream such that the high priority streams can be processed by one or more specific purpose processors 115. Acts 408g-412g are then generally analogous to acts 408f-412f of method 400f. Otherwise, if it is determined at 404g that the data stream priority is a low priority stream, at 414g, the data streams can be routed to a general purpose processor 120. In at least some cases, the data streams 414g may be routed to one or more general purpose processors 120 that have availability and/or are determined to be executing one or more software programs that can perform the required data processing operations on the data stream.

It will be appreciated that, in some cases, more than one data processing operation may be required to be performed on a data stream. Accordingly, in these cases, the method 400g can be iterated for each one or more separate data processing operations.

(v) Frequency of Required Processing Operations

Specific purpose processors 115 in system 100 can also be configured (or re-configured) based on the frequency of the required processing operations.

For example, in some cases, controller 125 can configure one or more specific purpose processors 115 to perform processing tasks which are high in frequency (e.g., processing tasks that are re-occurring), assuming no specific purpose processors 115 are currently configured to perform the high frequency tasks. In particular, this is because specific purpose processor 115 may be better suited for performing defined, tasks with high recurrence. Controller 125 can accordingly route data requiring the high frequency processing to the configured specific purpose processors 115. In other cases, controller 125 can also instruct general purpose processors 120 to perform processing tasks which are low in frequency.

Figure 4H:
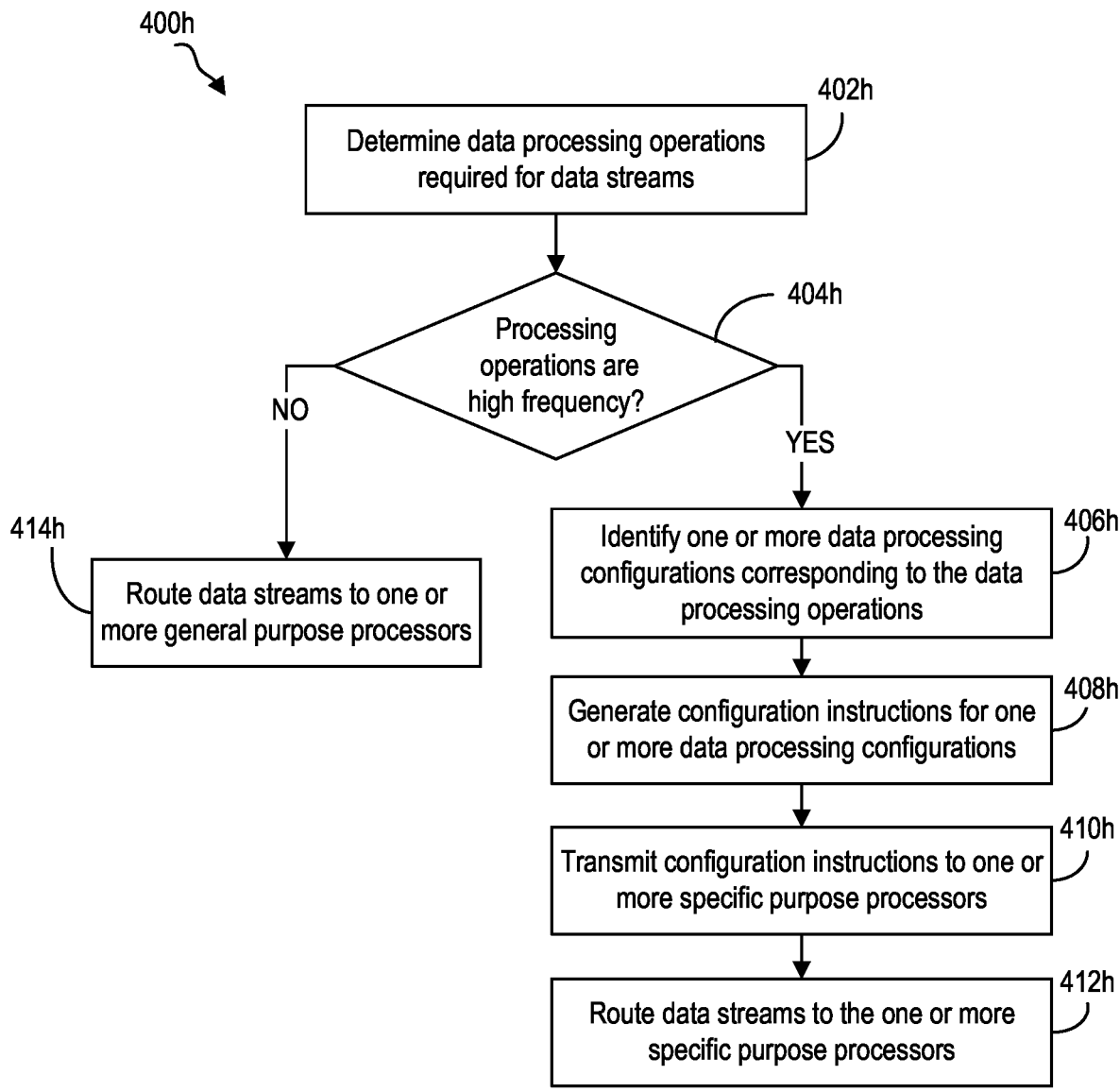
FIG. 4H is an example process flow for an example method for configuring one or more specific purpose processors to perform new data processing operations, according to still yet some other embodiments.

Referring now briefly to FIG. 4H, there is shown an example process flow for an example method 400h for configuring one or more specific purpose processors to perform data processing operations based on the frequency of the data processing operation, according to some other embodiments. The method 400h can be performed, for example, using controller 125 of system 100.

In particular, method 400h is generally analogous to method 400f of FIG. 4F, except that at 404h, controller 125 can determine if a particular data processing operation is a high frequency operation. For example, this can be determined based on the number of instances the operation has occurred in the past. In other cases, controller 125 can receive operation frequency information, e.g., from a data source 105. In still other cases, specific types of data processing operations may be known to the controller 125 as being high frequency operations. If the data processing operation is high frequency, at 406h, a data processing configuration corresponding to the data processing operations can then be identified. Acts 406h-412h are then generally analogous to acts 406f-412f of method 400f. Otherwise, if it is determined at 404h that the frequency of the data processing operations is a low frequency, at 414h, the data streams can be routed to a general purpose processor 120.

III. Example Application System for Out-Of-Sync Media Signals

Figure 3:
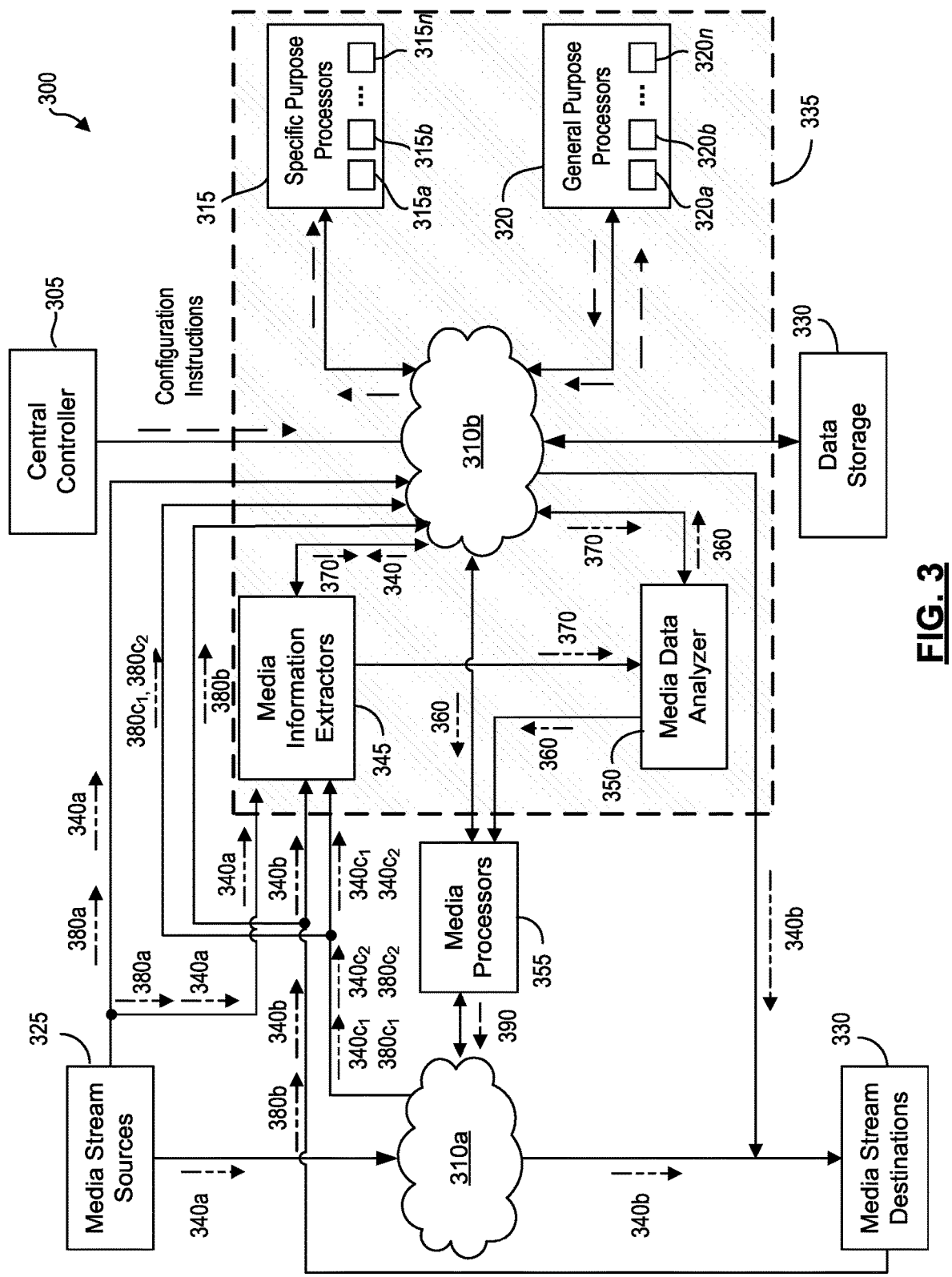
FIG. 3 is an example block diagram of a system for determining the extent to which two media signals are out of sync with each other, in accordance with at least some embodiments.

Reference is now made to FIG. 3, showing a block diagram for a system 300 for determining the extent to which two media signals are out of sync with each other. In particular, system 300 illustrates an example application of system 100 of FIG. 1.

As shown, system 300 generally includes a media stream source 325 for transmitting one or more media streams 340a to media stream destination 330, via media transport network 310a. Each media stream 340a can include one or more video signals, audio signals, or metadata signals. For example, a media stream 340a can include a single type of signal (e.g., audio, video or data), or a combination of multiple types of signals. In some cases, the different components of a media stream can be transmitted separately, such that information in one stream is not embedded in another stream. In some other cases, the various components of a media stream may be transmitted together, for example, multiplexed together, or audio and metadata streams being embedded in a non-visible portion of a video signal.

While only a single media stream source 325 and a single data stream destination 330 have been illustrated, it will be appreciated that system 300 can also include either a plurality of media stream sources 325 and/or a plurality of data stream destinations 330. Each media stream source 325 can transmit one or more media streams 340a to one or more media stream destinations 330.

System 300 may also include a media analysis system 335. In particular, as provided herein, media analysis system 335 can tap (e.g., re-route, or receive a copy) of media streams 340 at different points along the transmission pathway between source 325 and destination 330. The tapped media streams are then analyzed by the media analysis system 335 to determine, for example, one or more corrections (e.g., adjustments) to be made to out of sync media streams.

(a) Media Stream Source

Media stream source 325 can be one or more devices which generate media streams, similar to data source 105. For example, media stream source 325 can be a microphone that generates audio streams, or a camera that generates video streams.

In other embodiments, media stream source 325 can be one or more intermediate processors that process media streams from other upstream components, and transmits the processed media streams to network 310a. In still other cases, media stream source 325 can simply forward media streams received from other upstream components.

In some cases, media stream source 325 can automatically generate and/or transmit media streams to network 310a. In other cases, media stream source 325 can transmit media streams only after receiving instructions from a central controller (e.g., central controller 305).

In some embodiments, in addition to transmitting media streams, media stream sources 325 can also generate and transmit "source packets" for each media stream, or otherwise, each segment of a media stream (e.g., each video frame of a video stream).

In some example cases, each "source packet", generated by media stream source 325, can include time data (e.g., a time stamp) corresponding to the time when the source packet was generated. The time data can be generated using a clock synchronized for all devices in system 300, or using Precision Time Protocol (PTP). In various cases, the time data can be generated at the same time the media stream source 325 transmits the media stream, or the media stream segment. Accordingly, the time data can identify the time of transmission of each media stream, or media stream segment.

Source packets, generated by media source 325, can also contain "signature data" for each media stream or media stream segment. For example, signature data can include characteristic features that identify a corresponding media stream, or media stream segment.

For instance, in some example cases, signature data for a video frame can include an average luma value for the video frame, or otherwise, an average color value, average motion distance, or a contrast level. Similarly, signature data for an audio stream segment can include, for example, an envelope of a signal amplitude, average loudness level, peak formant, and average zero cross. The signature data for a metadata stream can include a hash value of all or a portion of the metadata.

In some embodiments, the signature data can correspond to a set of cotemporaneous segments of media streams. For example, the signature data can comprise characteristic features that identify a video frame, an audio segment cotemporaneous with the video frame, and metadata cotemporaneous with the video frame.

Source packets, generated by media stream source 325, can be transmitted in-band with the media streams 340a. In other words, the source packets can be transmitted with the media streams, or can be embedded in a metadata stream. In other cases, the source packets can be transmitted out of band (e.g., separately) from the media streams.

In some cases, the media stream source 325 can include one or more processors (e.g., media source processors) which generate the source packets.

(b) Media Stream Destination

Media stream destination 330 can include one or more devices that receive media streams 340*b* from media transportation network 310*a*, as well as source packets from media stream source 325.

Media stream destinations 330 can be, for example, one or more devices which display or play media streams 340*b* (e.g., a display monitor to display video streams, or speakers to play audio streams). In other cases, media stream destinations 330 can be devices for processing media streams 340*b*, and forwarding the media streams to other downstream devices. In still other cases, media stream destinations 330 can simply forward media streams 340*b* to other downstream devices.

Media stream destination 330 can also generate "destination packets" for each media stream, or media stream segment, received from network 310*a*. In particular, similar to source packets generated by media source 325, destination packets can include time data corresponding to when a destination packet was generated. For example, a destination packet can be generated when a media stream, or a segment of a media stream, is received by media stream destination 330. The time data can be generated using a clock synchronized for all devices in system 300, or using Precision Time Protocol (PTP).

Destination packets can also include, for example, "signature data" for received media streams or media stream segments, similar to signature data included in the source packets generated by media source 325. In some embodiments media stream destination 330 can also include one or more processors (e.g., media destination processors) which generate the destination packets.

As explained in further detail herein, the "source packets" and "destination packets" generated by each of the media stream source 325 and media stream destination 330, respectively, can be used for analyzing (e.g., determining) relative "synchronization errors" between media streams. For example, two media streams having the same source time data, but different destination time data, can be determined to be "out of sync".

(c) Media Transport Network

Media transport network 310*a*, can be for example an SDN network, or otherwise, any suitable network for transporting media streams.

Media transport network 310*a* can include network switches and routing nodes, but can also include a number of media processing devices (not shown) to process media streams 340*a*. For example, media transport network 310*a* can include video compressors (e.g., MPEG compressor), video encoders and decoders, and other video processing devices that alter, or modify, an input video stream 340*a* to generate an output processed video stream 340*b*. Similarly, media transport network 310*a* can include audio processing devices, such as audio compressors and de-compressors, multiplexers, and audio dynamic range processors that alter, or modify, an input audio stream 340*a* to generate a processed output audio stream 340*b*. Media network 310*a* can also include processing devices which modify or alter metadata, and/or which generate new metadata.

In at least some embodiments, processing devices inside of media transport network 310*a* can generate "intermediate packets". The "intermediate packets" can be similar to the source and destination packets generated by media stream sources 325 and media stream destinations 330, respectively. The intermediate packets can include, for example, time data information, as well as signature data information for processed media streams, or media stream segments.

In various cases, media processing devices inside of network 310*a* can introduce processing delays to media streams travelling inside of network 310*a*. Accordingly, an output media stream 340*b* can be a delayed version of an input media stream 340*a*. Further, processing delays can de-synchronize multiple input streams that are initially synchronized. For example, multiple streams 340*a* can travel inside network 310*a* through different transmission pathways. Each stream 340*a* can encounter different processing devices, and experience different processing delays. Accordingly, the output media streams 340*b* can be temporally misaligned from each other resulting from experiencing different processing delays. For example, audio and video streams 340*a* initially synchronized, can be received out of sync. This, in turn, can cause the video stream to run ahead, or lag behind, the audio stream, which results in "lip syncing" error.

In addition to processing delays, processing devices inside of media network 310*a* can also de-synchronize the content of media streams.

For example, a single video stream can be transmitted as separate video stream portions through network 310*a*. For example, this can be done to accommodate bandwidth constraints in network 310*a*. For instance, a single high-resolution video stream can be transmitted as multiple low-resolution video streams through network 110. In other cases, a single video stream can be transmitted as multiple video stream portions 340*a*, where each video stream portion 340*a* corresponds to a different layer of the original video stream. For example, one video stream portion can correspond to a base video layer, and another video stream portion can correspond to an element superimposed over the base video layer (e.g., a logo, news feed or other text ticker). In some cases, a separate data stream can also be transmitted to indicate the spatial relationship between different video stream portions 340*a* (e.g., spatial relationship between a base and superimposed video layer stream). In particular, the multiple video streams 340*a* can travel inside of network 310*a* through different transmission pathways. Each video stream 340*a* can encounter different processing devices, where each processing device can introduce different compression artifacts, or different adjustments to the video size or frame rate. Accordingly, the output video streams 340*b* can have desynchronized content resulting from experiencing different processing devices. As a result, the output video streams may not combine correctly into a single video stream at a destination device.

In still other example cases, multiple video streams can be transmitted from separate sources to media network 310*a*. For example, different cameras recording the same televised event from different angles can generate different video streams. The multiple video streams can travel through network 310*a* and can experience different processing devices, which can also result in desynchronization of content between the video streams.

In view of the foregoing, processing devices in media transmission network 310*a* can introduce temporal misalignment and content synchronization errors between various synchronized media streams.

(d) Media Analysis System

As shown in FIG. 3, to correct and adjust for de-synchronization errors resulting from media network 310*a*, system 300 can include a media analysis system 335. Media analysis system 335 can "tap" (e.g., receive a copy) of media streams 340 at different points along the transmission pathway. As used herein, "tapping" a media stream can comprise either obtaining (i.e., receiving or generating) a copy of the media stream for analysis, or otherwise re-routing the original media stream for analysis. In particular, it will be appreciated that using SDN networks may, in some cases, facilitate "tapping" (e.g., copying and/or re-routing) of media streams via a software-controlled data plane. Media analysis system 335 can then analyze different tapped media streams to determine the relative synchronization between the tapped media streams.

For example, in at least some embodiments, media analysis system 335 can tap the media stream 340 at a first "tap point" located at media stream source 325 (e.g., media stream 340a), and at a second "tap point" located at media stream destination 330 (e.g., media stream 340b). Media analysis system 335 can also tap the media streams inside of network 310a. For example, media analysis system 335 can tap a first intermediate media signal 340ci at a first "tap point" inside of network 310a, and can tap a second intermediate media signal 340c2 at a second "tap point" inside of network 310a. Accordingly, various tap points can be selected anywhere along the transmission pathway, and any number of tap points can be selected.

In addition or in the alternative to receiving tapped media streams, media analysis system 335 can also receive the source packet data 380a and destination packet data 380b associated with the tapped media streams. In particular, the source and destination packet data 380a, 380b can also be used by the media analysis system 335 to determine the relative synchronization error between two tapped media streams.

In some cases, media analysis system 335 can also receive "intermediate packet data" from intermediate processing devices inside of network 310a. For example, media analysis system 335 can receive a first intermediate packet data 380ci corresponding to a first tapped media stream 340ci, and second intermediate packet data 380c2 corresponding to a second tapped media stream 340c2. The packet data can be used by media analysis system 335 to determine synchronization error between two intermediate streams.

In order to analyze different tapped media streams (or data packets) media to determine the relative synchronization error, the media analysis system 335 can generally include one or more media information extractors 345, connected via media analysis network 310b, to one or more media data analyzers 350.

Media analysis network 310b can be, for example, an SDN network. Although shown separately from media network 310a for illustrative purposes, media transmission network 310a and media analysis network 310b can be the same network. For example, the networks 310 can have a single SDN controller receiving instructions from central controller 305. In other cases, the central controller 305 can itself act as an SDN controller for both networks. In other cases, media transport network 310a may be a separate network from network 310b. For instance, media transport network 310a can be an SDN having a higher transmission bandwidth than network 310b to facilitate transmission of media signals. In other cases, media transport network 310a may be a separate network, but may not be an SDN network.

Media information extractors 345 is configured to extract characteristic features from tapped media signal 340. For example, media information extractor 345 can receive tapped media streams from any one of media stream sources 325 (e.g., media streams 340a), media stream destinations 330 (e.g., media streams 340b), or intermediate network devices (not shown) (e.g., media streams 340ci and 340c2). Media information extractor 345 can receive the tapped media streams via network 310b.

In various cases, the characteristic features extracted by media information extractors 350 can be used for determining the relative extent of desynchronization between tapped media signals.

In particular, in some embodiments, the extracted features can correspond to features that vary over time, but are otherwise not easily varied, altered or corrupted by media processing devices inside network 310a. For example, where the media signals are audio signals, the extracted features can include the envelope of the audio signal amplitude, the average loudness level, the peak formant of the audio signal and the average zero crossing rate. In cases where the media signal is a video signal, extracted features can include average luma or color value, average motion distance, and contrast level of the signal.

In some cases, the media information extractor 345 can also sample the extracted features to generate a sampled feature signal 370.

Media data analyzer 350 can receive extracted feature signals 370 from media information extractor 345, and can compare the extracted feature signals 370 between two or more sets of tapped media streams. Based on the comparison, data analyzer 350 can determine delays between two sets of tapped media stream, or variations in content between sets of tapped media streams. Accordingly, the data analyzer can determine the extent the media streams are desynchronized (e.g., in time or content).

In some cases, media data analyzer 350 can also determine synchronization error based on packet data 380 for two or more sets of tapped media streams. For example, for each media stream, or media stream segment, data analyzer 350 can compare time stamp information in packet data 380 at a first tap point, and time stamp information in packet data at a second tap point. Data analyzer 350 can then determine the temporal misalignment between the two sets of tapped media streams.

Similarly, media data analyzer 350 can compare signature data between two sets of tapped media streams to determine temporal misalignment or content desynchronization between media streams. For example, data analyzer 350 can analyze signature data for each segment of an audio stream, and each segment of a video stream. When the streams are synchronized, each video segment (e.g., video frame) may have a corresponding audio stream segment. Accordingly, data analyzer 350 can correlate signature data for each video segment (e.g., video frame) and each audio segment at a first tap point. As the audio and video streams desynchronize inside of network 310a, each video segment can become temporally misaligned from the corresponding audio segment. Accordingly, data analyzer 350 can analyze misaligned signature data at a second tap point to determine the extent of temporal misalignment between two streams.

In various embodiments, once the data analyzer 350 has determined the extent of synchronization error between tapped media streams, data analyzer 350 can transmit instructions—via control signal 360—to one or more media processors 355 to correct the synchronization error. The control signal 360 can instruct the media processors 355 to perform an adjustment operation to media streams to compensate for the desynchronization.

Media processors 355 can be, for example, one or more intermediate processors located inside of the media network 310a which process media streams. That is, while shown separately from media network 310a for ease of exposition, the media processors 355 may in-fact be located inside the network 310*a*. The media processors 355 can receive the control signals 360 and can implement an adjustment operation to media streams compensate for the media stream desynchronization.

In other cases, media processors 355 can be processors located inside of media stream destination 330. Accordingly, the media processors 355 can implement an adjustment operation on media streams received at the media stream destination 330.

In either case, in accordance with the control signals 360, the media processors 355 can apply one or more required adjustments (i.e., re-synchronization operations) to generate one or more adjusted (or synchronized) media streams 390. The adjusted media streams 390 may comprise, for example, synchronized (or re-synchronized) video, audio and/or metadata streams. In cases where the media processors 355 correspond to intermediate processors located inside of the media network 310*a*, the adjusted media streams 390 may be output (i.e., fed) back into the media network 310*a* to continue along their original transmission path. In particular, in some cases, the adjusted media streams 390 may comprise (or be incorporated into) the output media streams 340*b*, which are output from network 310. In other cases, where the media processors 355 are located, for example, at a media stream destination 330, then the adjusted media streams 390 may be stored or output at the media stream destination 330, or otherwise, transmitted to further downstream devices.

(e) Specific and General Purpose Processors

Referring still to FIG. 3, each of the media information extractors 345, media data analyzers 350, and media processors 355 can be implemented using either specific purpose processors 315 and/or general purpose processors 320.

In particular, system 300 can include one or more specific purpose processors 315*a*-315*n* and one or more general purpose processors 320*a*-320*n* which are in communication with central controller 305 via network 310*b*. The specific purpose processors 315 and general purpose processors 320 are analogous to the specific purpose processors 115 and general purpose processors 125 in systems 100 and 200 of FIGS. 1 and 2.

Central controller 305 can operate similar to central controller 125 of system 100. For example, central controller 305 can designate one or more specific purpose processors 315 and/or general purpose processor 320 to implement the media processing operations of the media information extractors 345, media data analyzers 350 and/or media processors 355.

In particular, it will be appreciated that while—for ease of exposition—the specific purpose processors 315 and general purpose processors 320 are illustrated separately in FIG. 3 from the media information extractors 345, media data analyzers 350 and media processors 355—in various cases, the processing operations performed by each of these components (345, 350, 355) may be in-fact implemented by one of processors 315, 320. In other words—the illustrated blocks 345, 350, 355 may in-fact, in at least some embodiments, be the same as the specific purpose processors 350 and/or general purpose processor 320. To this end, each processing operation for illustrated blocks 345, 350, 355 can be performed using only a single type of processor, or a combination both types of processors.

More particularly, in some example embodiments, one or more specific purpose processors 315 can be designated to perform media information extraction 345 operations, media data analyzer 350 operations and/or media processing 355 operations.

In respect of the media information extraction 345 operations—different specific purpose processors 315 can perform different types of media information extraction operations. For example, some specific purpose processors 315 can perform media information extraction on video streams, while other specific purpose processors 315 can perform media information extraction on audio streams. Accordingly, central controller 305 can designate some specific purpose processors 315 to receive video streams, while designating other specific purpose processors 315 to receive audio streams. In still other cases, different specific purpose processors 315 can extract only specific types of features from media streams.

In still some further embodiments, the processing function of a media information extractor can be divided between two or more specific purpose processors 315. For example, one or more specific purpose processors 315 can perform media information extraction, while one or more specific purpose processors 315 can sample the extracted features to generate extracted feature signals. Accordingly, controller 305 can route data streams through more than one specific purpose processor 315 to generate the sampled extracted feature signals.

In still other cases, central controller 305 can designate one or more general purpose processors 320 (rather than specific purpose processors 115) to perform operations of the media information extractor 345.

Similarly, in respect of media data analyzer 350 operations—one or more specific purpose processors 315 can be designated to perform operations corresponding to the function of media data analyzers 350.

For example, central controller 305 can designate some, or all, of these processors to receive extracted feature signals for one or more tapped" media streams. In some cases, different specific purpose processors 315 can be configured to perform different types of media analysis. For example, some specific purpose processors 315 can determine temporal misalignment between media streams, based on extracted features. Further, other specific purpose processors 315 can determine content desynchronization between multiple media streams. In other cases, one or more general purpose processors 320 can be designated to perform the media analysis operations.

In at least some embodiments, the processors—inside of media stream source 325 and destination stream source 350—which generate the source and destination packets, respectively, can also be specific purpose processors 315 and/or general purpose processors 320.

In still other embodiments, the specific purpose processors 315 can also perform operations of the media processors 355.

For example, the specific purpose processors 315 can receive one or more media streams, as well as control signals for an adjustment operation to correct the one or more media streams. In various cases, the control signal can be received from other specific and/or general purpose processors which perform the media analysis function.

In other cases, a general purpose processor 310 can be designated to perform the operations of the media processors 355.

In some cases, specific purpose processors 315 and/or general purpose processors 320 can also act as intermediate processors inside network 310*a* to process media streams, and to generate intermediate data packets.

In various embodiments, the processing operations of specific purpose processors 315 can be configured, or re-configured, by configuration instructions generated by the central controller 305 and/or a general purpose processor 320, in a manner analogous to that previously described for system 100.

For instance, in some example cases, central controller 125 can modify the processing operation of processors to balance the processing load of system 300. For example, controller 305 can determine that one or more specific purpose processors 315 and/or general purpose processors 320 is operating at, or near, maximum processing capacity—or otherwise—is expected to operate at, or near, maximum capacity. Accordingly, controller 305 can configure other available specific purpose processors 315 to perform all, or some, of the processing operations performed by the processors. For example, controller 305 can configure specific purpose processors 315 to perform media information extraction, media data analysis, or media processing operations being performed by an overcapacity processor.

In other cases, controller 305 can also transmit instructions to one or more general purpose processors 320 to perform all, or some, of the media processing operations performed by specific purpose processors 315 and/or general purpose processors 320 operating at capacity.

In still other embodiments, similar to central controller 125, controller 305 can modify processors 315, 320 to accommodate for different processing requirements of incoming media streams. For example, as explained previously with respect to FIG. 1, controller 305 can configure specific purpose processors 315 to perform new data processing operations to accommodate for different processing operations required for incoming media streams (e.g., feature extraction, media data analysis, or media data processing), as well as configuring specific purpose processors 315 to accommodate the complexity of the processing operations, the processing priority of the media stream, as well as the frequency of the processing operations.

Referring now back to FIG. 4A, which is now explained herein in view of the example application of system 300 in FIG. 3. In particular, as stated previously, FIG. 4A shows an example process flow for a method 400a for designating processors to receive and process media streams. In the example application of system 300, method 400a can be performed by controller 305.

At 402a, controller 305 can identify and/or determine the processing requirements for one or more media streams inside of system 300. For example, controller 305 can determine that synchronization error correction or adjustment is required for one or more media streams travelling along the transmission pathway between media stream sources 325 and media stream destinations 330.

The determination, at 402a, may be performed by the controller 305 either automatically or in response to pre-defined events.

For example, in at least some embodiments, the determination at 402a may be made automatically by controller 305. For instance, controller 305 may be pre-configured to determine, or identify, that at specific known points along the transmission pathway (e.g., at intermediate points in network 310a, or at media stream destinations 330), that the transmitted media streams may require synchronization error correction. For example, this information may be provided apriori to the controller 305 (i.e., by an external input from a system administrator). In still other cases, controller 305 may be pre-configured to determine that only specific types of media streams (e.g., video or audio), or media streams transmitted from particular sources 325 or received at specific destinations 330, or streams which travel through specific transmission pathways through network 310a, require synchronization error correction.

In still yet other embodiments, controller 305 can determine that a synchronization error correction is required in response to pre-defined events. For example, controller 305 can receive a request from one or more media stream destinations 330, or intermediate network devices (not shown), requesting a synchronization error correction. The pre-defined event may also correspond to a request that is externally generated (e.g., an external user input). For example, an external input may request that the controller 305 co-ordinate a synchronization error correction at one or more defined points along the transmission pathway.

For media streams requiring synchronization error correction, at 402a, controller 305 can also identify specific processing requirements for these media streams.

For example, controller 305 can identify the processing priority for the media streams. For instance, media streams generated as part of live programming content may be determined, at 402a, to be high priority streams requiring immediate synchronization error correction, whereas media streams for programming content that is displayed at a scheduled future point in time (e.g., re-played media streams) may be identified as lower priority streams. In various cases, the priority of the media stream may be determined as has been previously explained herein.

In still other cases, at 402a, controller 305 can identify the complexity of the synchronization error correction operations required for the media streams. For instance, in some cases, the complexity of the synchronization error correction can be determined based on the type of media stream being transmitted. For example, high-resolution video streams may require higher complexity synchronization error corrections, as compared to lower-resolution video streams. In still other cases, the complexity of the synchronization error correction may be determined based on the type of synchronization error correction required. For example, specific types of synchronization adjustments or otherwise highly de-synchronized media streams may require more complex operations (i.e., higher processing power) for re-synchronization. In at least some cases, controller 305 may store (i.e., in an embedded memory) complexity data information in respect of different types of synchronization adjustments. In other cases, this information may be provided to the controller 305 from an external source (i.e., media stream source 340a, media data information extractors 345 and/or media data analyzer 350).

In some other embodiments, at 402a, controller 305 can also determine the frequency of the synchronization error correction operations required to be performed. For example, high frequency synchronization error corrections may result from media streams which are being transmitted in large volumes from the same media stream sources 325.

At 404a, controller 305 can determine the types of processing operations being performed by each specific purpose processor 315 and/or general purpose processor 320 in system 300 in a manner previously discussed. In particular, at 404a, controller 305 can determine which specific purpose processors 315 and/or general purpose processors 320 are configured for—or otherwise adapted for performing—media information extraction 345 operations, media data analyzing 350 operations and/or media processing 355 operations.

At 406a, controller 305 can determine the processing availability of the various specific purpose processors 315 and/or general purpose processors 320 in system 300 as previously explained.

At 408a, based on the processing requirements for the media streams, as well as the processing operations performed by each processor 315, 320, and the processing availability of each processor—controller 305 can designate one or more processors 315, 320 to receive and process media streams 340a, 340b, 340c and/or associated packet data 380a, 380b, 380c.

For example, in at least some embodiments, specific purpose processors 315 may be designated for high priority streams (e.g., streams associated with live broadcast programs), while general purpose processors 320 may be designated for low priority streams (e.g., media streams associated with re-played content). In other cases, specific purpose processors 315 may be designated for streams requiring low complexity re-synchronization operations (i.e., small synchronization error corrections), or high frequency operations, while general purpose processors 320 may be designated for streams requiring high complexity re-synchronization operations (i.e., large synchronization errors and/or synchronization error corrections requiring large processing power) or otherwise low frequency re-synchronization operations. As stated previously, in various cases, controller 305 may store in a memory (e.g., embedded or accessible memory) a prioritization list of factors in designating processors. For example, to mitigate conflicts, controller 305 may prioritize media stream priority over the complexity of the required synchronization correction operations. Accordingly, high priority streams may be designated to specific purpose processors 315 despite the fact that the media streams require high complex re-synchronization operations, or the operations are low in frequency.

In at least some embodiments, at 408a, controller 305 may designate separate specific purpose processors 315 and/or general purpose processors 320 to perform each of the media information extraction 345 operations, media data analyzer 350 operations and/or media processor 355 operations.

For example, controller 305 may initially designate one or more first specific or general purpose processors 315, 320—configured to perform media information extraction 345 operations—to receive the tapped media streams and/or packet data. Controller 305 can then designate one or more second specific and/or general purpose processors 315, 320—configured to perform media data analyzer 350 operations—to then receive the output of the one or more first specific and/or general purpose processors 315, 320. Controller 305 may then designate one or more third specific or general purpose processors 315, 320—configured to perform media processor 355 operations—to receive the output of the one or more second specific or general purpose processors 315, 320, and in turn, generate the output adjusted media streams 390. It will be appreciated that there may also be partial or complete overlap between the first, second and/or third designated specific and/or general purpose processors (i.e., the same processors may be designated to perform one or more of the media information extraction 345 operations, media data analyzer 350 operations and/or media processor 355 operations).

In particular, in some example cases—for a given set of media streams—method 400a may be separately performed (i.e., multiple times) to designate processors for each of, or one or more of, the media information extraction operations 345, and then repeated again to designate processors for media data analysis 350 operations, and then again for media processing 355 operations. In at least some embodiments, repeating the method 400a in this manner may ensure that processors are being designated based on the specific nature of the sub-processing task (e.g., 345, 350, 355). For example, for a given synchronization error correction, the media information extraction 345 and media data analyzing 350 operations may not be particularly complex and may be allocated to specific purpose processors 315. However, controller 305 may determine that correcting the synchronization errors by the media processors 355 is a highly complex process. For example, this determination may be made based on the output of the information extractors 345 and/or analyzers 350 which determine extent of de-synchronization. Accordingly, method 400a may be repeated to allow the controller 305 to designate one or more general purpose processors 320 to perform the complex function of the media processors 355, and in turn, generate adjusted output streams 390.

At 410a, based on the designations, controller 305 can route the media streams and/or packet data to the designated processors.

In various embodiments, controller 305 may also be configured to perform any one of methods 400b (FIG. 4B), 400c (FIG. 4C), 400D (FIG. 4D), 400e (FIG. 4E), 400f (FIG. 4F), 400g (FIG. 4G), 400e (FIG. 4E) with respect to specific purpose processors 315, general purpose processors 320 and media streams 340 and/or associated data packets 380. In some cases, each of these methods may be separately performed to designate processors for each of the media information extraction operations 345, media data analysis 350 operations and/or media processing operations 355.

The present invention has been described here by way of example only. Various modification and variations may be made to these exemplary embodiments without departing from the spirit and scope of the invention, which is limited only by the appended claims.

We claim:

1. A system for processing data streams, comprising:
one or more specific purpose content processors in communication with a data transmission network, wherein each of the one or more specific purpose content processors has a corresponding hardware configuration for executing at least one data processing operation, wherein the corresponding hardware configuration is re-configurable to other hardware configurations associated with other data processing operations;
one or more general purpose processors in communication with the data transmission network;
a controller coupled to the data transmission network, the controller configured to:
analyze a content of a data stream received from the data transmission network to determine one or more required data processing operations for the data stream;
identify at least one required data processing configuration corresponding to the one or more required data processing operations; select at least one designated processor from the one or more specific purpose content processors and the one or more general purpose processors, wherein the at least one designated processor is selected according to at least one of:
a corresponding hardware configuration of the one or more specific purpose content processors being associated with the at least one required data processing configuration;

a corresponding data processing functionality of the one or more general purpose processors being associated with the at least one required data processing configuration; and a corresponding complexity of the one or more required data processing operations; and route the data stream to the at least one designated processor to perform the one or more required data processing operations to produce a processed data stream with processed content, wherein the hardware configuration of the at least one designated processor is re-configured to implement the one or more data processing operations.

2. The system of claim 1, wherein the one or more required data processing operations comprise a plurality of sub-data processing operations.

3. The system of claim 1, wherein the hardware configuration in the at least one designated processor is re-configured in response to receiving configuration instructions in respect of the one or more required data processing operations.

4. The system of claim 3, wherein the controller is configured to transmit the configuration instructions to the at least one designated processor.

5. The system of claim 3, wherein the configuration instructions are stored on the one or more general purpose processors, and the controller is further configured to at least one of:

retrieve the configuration instructions from the one or more general purpose processors and transmit the configuration instructions to the at least one designated processor; or transmit instructions to the one or more general purpose processors to transmit the configuration instructions to the at least one designated processor.

6. The system of claim 1, wherein the data stream comprises a media stream, and the one or more data processing operations comprise at least one of: extracting a characteristic feature from the media stream, comparing one or more characteristic features extracted from one or more media streams to determine a synchronization error, and adjusting one or more media streams to compensate for the synchronization error.

7. The system of claim 1, wherein the at least one specific purpose content processor is a field programmable gate array (FPGA).

8. The system of claim 1, wherein the at least one designated processor is further selected according to at least one of:

a priority level of the data stream; or a frequency of the one or more required data processing operations.

9. A method for processing data streams, comprising:

analyzing a content of a data stream received from a data transmission network to determine one or more required data processing operations for the data stream;

identifying at least one required data processing configuration corresponding to the one or more required data processing operations;

selecting at least one designated processor from one or more specific purpose content processors in communication with the data transmission network, each of the one or more specific purpose content processors having a corresponding hardware configuration for executing at least one data processing operation, and the corresponding hardware configuration being re-configurable to other hardware configurations associated with other data processing operations, and one or more general purpose processors in communication with the data transmission network, wherein the at least one designated processor is selected according to at least one of:

a corresponding hardware configuration of the one or more specific purpose content processors being associated with the at least one required data processing configuration;

a corresponding data processing functionality of the one or more general purpose processors being associated with the at least one required data processing configuration; and a corresponding complexity of the one or more required data processing operations; and routing the data stream to the at least one designated processor to perform the one or more required data processing operations to produce a processed data stream with processed content, wherein the hardware configuration of the at least one designated processor is re-configured to implement the one or more required data processing operations.

10. The system of claim 9, wherein the one or more required data processing operation comprises a plurality of sub-data processing operations.

11. The method of claim 9, further comprising receiving, at the at least one designated processor, configuration instructions for changing the hardware configuration of the at least one designated processor to implement the one or more required data processing operations.

12. The method of claim 11, further comprising transmitting, by the controller, the configuration instructions to the at least one designated processor.

13. The method of claim 11, further comprising at least one of:

retrieving, by the controller, the configuration instructions from the one or more general purpose processors, and transmitting, by the controller, the configuration instructions to the at least one designated processor; or transmitting, by the controller, instructions to the one or more general purpose processors to transmit the configuration instructions to the at least one designated processor.

14. The method of claim 9, wherein the data stream comprises a media stream, and the one or more data processing operations comprise at least one of: extracting a characteristic feature from the media stream, comparing one or more characteristic features extracted from one or more media streams to determine a synchronization error, adjusting one or more media streams to compensate for the synchronization error.

15. The method of claim 9, wherein the at least one specific purpose content processor is a field programmable gate array (FPGA).

16. The method of claim 9, wherein the at least one designated processor is selected according to at least one of:

a priority level of the data stream; or a frequency of the one or more required data processing operations.

17. A controller configurable to:

analyze a content of a data stream received from a data transmission network to determine one or more required data processing operations for the data stream;

identify at least one required data processing configuration corresponding to the one or more required data processing operations;

select at least one designated processor from one or more specific purpose content processors in communication with the data transmission network, wherein each of the one or more specific purpose content processors has a corresponding hardware configuration for executing at least one data processing operation, and the corresponding hardware configuration is re-configurable to other hardware configurations associated with other data processing operations, and one or more general purpose processors in communication with the data transmission network, wherein the at least one designated processor is selected according to at least one of:
- a corresponding hardware configuration of the one or more specific purpose content processors being associated with the at least one required data processing configuration;
- a corresponding data processing functionality of the one or more general purpose processors being associated with the at least one required data processing configuration; and
- a corresponding complexity of the one or more required data processing operations; and route the data stream to the at least one designated processor to perform the one or more required data processing operations to produce a processed data stream with processed content, wherein the hardware configuration of the at least one designated processor is re-configured to implement the one or more required data processing operations.

18. The controller of claim 17, wherein the at least one designated processor is selected according to at least one of:
- a priority level of the data stream; or
- a frequency of the one or more required data processing operations.

* * * * *